US012159635B2

(12) United States Patent
Bruhn

(10) Patent No.: US 12,159,635 B2
(45) Date of Patent: *Dec. 3, 2024

(54) BURST FRAME ERROR HANDLING

(71) Applicant: Telefonaktiebolaget LM Ericsson (publ), Stockholm (SE)

(72) Inventor: Stefan Bruhn, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,560

(22) Filed: May 19, 2023

(65) Prior Publication Data

US 2023/0368802 A1 Nov. 16, 2023

Related U.S. Application Data

(63) Continuation of application No. 17/382,042, filed on Jul. 21, 2021, now Pat. No. 11,694,699, which is a continuation of application No. 16/709,297, filed on Dec. 10, 2019, now Pat. No. 11,100,936, which is a continuation of application No. 15/902,223, filed on Feb. 22, 2018, now Pat. No. 10,529,341, which is a continuation of application No. 14/651,592, filed as (Continued)

(51) Int. Cl.
*G10L 19/005* (2013.01)
*G10L 19/028* (2013.01)

(52) U.S. Cl.
CPC .......... *G10L 19/005* (2013.01); *G10L 19/028* (2013.01)

(58) Field of Classification Search
None
See application file for complete search history.

(56) References Cited

U.S. PATENT DOCUMENTS 6,044,338 A * 3/2000 Akune .................. G10L 19/005 704/226
6,144,936 A 11/2000 Järvinen et al.
6,952,668 B1 10/2005 Kapilow
(Continued)

FOREIGN PATENT DOCUMENTS

CN 1815880 A 8/2006
EP 1433164 A4 7/2006
(Continued)

OTHER PUBLICATIONS

International Searching Authority, Invitation to pay additional fees, communication relating to the results of the partial international search, issued in corresponding International Application No. PCT/SE2015/050662, dated Aug. 10, 2015, 5 pages.
(Continued)

*Primary Examiner* — Douglas Godbold
(74) *Attorney, Agent, or Firm* — Rothwell, Figg, Ernst & Manbeck, P.C.

(57) ABSTRACT

There is provided mechanisms for frame loss concealment. A method is performed by a receiving entity. The method comprises adding, in association with constructing a substitution frame for a lost frame, a noise component to the substitution frame. The noise component has a frequency characteristic corresponding to a low-resolution spectral representation of a signal in a previously received frame.

14 Claims, 5 Drawing Sheets

Related U.S. Application Data application No. PCT/SE2015/050662 on Jun. 8, 2015, now Pat. No. 9,972,327.

(60) Provisional application No. 62/011,598, filed on Jun. 13, 2014.

(56) References Cited

U.S. PATENT DOCUMENTS

| | | | | |
|---|---|---|---|---|
| 6,993,483 | B1* | 1/2006 | Milner | G10L 15/30 704/E15.047 |
| 9,972,327 | B2* | 5/2018 | Bruhn | G10L 19/005 |
| 2004/0221209 | A1 | 11/2004 | Kupferschmidt et al. | |
| 2004/0250195 | A1* | 12/2004 | Toriumi | G10L 19/005 704/E19.003 |
| 2005/0015242 | A1* | 1/2005 | Gracie | H01Q 1/38 704/211 |
| 2005/0137857 | A1* | 6/2005 | Greer | G10L 19/16 704/201 |
| 2006/0178872 | A1* | 8/2006 | Sung | G10L 19/005 704/E19.025 |
| 2006/0265216 | A1 | 11/2006 | Chen | |
| 2007/0198254 | A1* | 8/2007 | Goto | G10L 19/005 704/226 |
| 2008/0015856 | A1* | 1/2008 | Lee | G10L 19/005 704/E19.003 |
| 2008/0082343 | A1* | 4/2008 | Maeda | G10L 19/005 704/E19.023 |
| 2009/0070117 | A1* | 3/2009 | Endo | G10L 19/005 704/265 |
| 2009/0103517 | A1 | 4/2009 | Ohmuro et al. | |
| 2009/0240490 | A1* | 9/2009 | Kim | G10L 19/125 704/226 |
| 2009/0276212 | A1* | 11/2009 | Khalil | G10L 21/045 704/226 |
| 2010/0286805 | A1* | 11/2010 | Gao | G10L 19/005 700/94 |
| 2011/0191111 | A1 | 8/2011 | Chu et al. | |
| 2011/0208517 | A1* | 8/2011 | Zopf | G10L 19/005 704/211 |
| 2012/0010882 | A1 | 1/2012 | Thyssen et al. | |
| 2014/0142957 | A1* | 5/2014 | Sung | G10L 19/0204 704/500 |
| 2014/0207445 | A1* | 7/2014 | Gao | G10L 19/005 704/220 |
| 2015/0142452 | A1* | 5/2015 | Sung | G10L 19/12 704/500 |

FOREIGN PATENT DOCUMENTS

| | | | |
|---|---|---|---|
| JP | 2002229593 | A | 8/2002 |
| JP | 2003099096 | A | 4/2003 |
| JP | 2004533021 | A | 10/2004 |
| WO | 03/023763 | A1 | 3/2003 |
| WO | 2014/123469 | A1 | 8/2014 |
| WO | 2014/123470 | A1 | 8/2014 |
| WO | 2014/123471 | A1 | 8/2014 |

OTHER PUBLICATIONS

Written Opinion dated May 17, 2017, issued in Singapore Patent Application No. 11201609159P, 5 pages.

Japanese Office Action dated Mar. 19, 2018, issued in Japanese Patent Application No. 2016-548620, 7 pages.

Extended European Search Report dated May 16, 2018, issued in European Patent Application No. 18167282.5, 11 pages.

Stefan Bruhn et al. "A Novel Sinusoidal Approach to Audio Signal Frame Loss Concealment and Its Application in the News EVS CODEC Standard" 2015 IEEE International Conference on Acoustics, Speech and Signal Processing (ICASSP), IEEE, Apr. 19, 2015, pp. 5142-5146.

"Concealment Operation Related to MDCT Modes", 3GPP TS 26.447 V0.0.1 (May 2014), pp. 38-78.

First Chinese Office Action dated Mar. 22, 2019, issued in Chinese Patent Application No. 201580031034.X, 4 pages.

Indian Examination Report dated Jul. 12, 2019, issued in Indian Patent Application No. 201617039830, along with English translation, 6 pages.

* cited by examiner

BURST FRAME ERROR HANDLING

CROSS-REFERENCE TO RELATED APPLICATIONS

This application is a continuation of application Ser. No. 17/382,042, filed Jul. 21, 2021, which is a continuation of application Ser. No. 16/709,297, filed Dec. 10, 2019 (now U.S. Pat. No. 11,100,936), which is a continuation of application Ser. No. 15/902,223, filed Feb. 22, 2018 (now U.S. Pat. No. 10,529,341), which is a continuation of Ser. No. 14/651,592, filed on Jun. 11, 2015 (now U.S. Pat. No. 9,972,327), which is a 35 U.S.C. § 371 National Stage of International Application No. PCT/SE2015/050662, filed Jun. 8, 2015, designating the United States, which claims priority to U.S. Provisional Application No. 62/011,598, filed Jun. 13, 2014. The above identified applications and publication are incorporated by this reference.

TECHNICAL FIELD

This document relates to audio coding and the generation of a substitution signal in the receiver as a replacement for lost, erased or impaired signal frames in case of transmission errors. The technique described herein could be part of a codec and/or of a decoder, but it could also be implemented in a signal enhancement module after a decoder. The technique may be used with advantage in a receiver.

Particularly, embodiments presented herein relate to frame loss concealment, and particularly to a method, a receiving entity, a computer program, and a computer program product for frame loss concealment.

BACKGROUND

Many modern communication systems transmit speech and audio signals in frames, meaning that the sending side first arranges the signal in short segments or frames of e.g. 20-40 ms which subsequently are encoded and transmitted as a logical unit in e.g. a transmission packet. The receiver decodes each of these units and reconstructs the corresponding signal frames, which in turn are finally output as continuous sequence of reconstructed signal samples. Prior to encoding there is usually an analog to digital (A/D) conversion that converts the analog speech or audio signal from a microphone into a sequence of audio samples. Conversely, at the receiving end, there is typically a final digital to analog (D/A) conversion that converts the sequence of reconstructed digital signal samples into a time continuous analog signal for loudspeaker playback.

Almost any such transmission system for speech and audio signals may however suffer from transmission errors. This may lead to the situation that one or several of the transmitted frames are not available at the receiver for reconstruction. In that case, the decoder has to generate a substitution signal for each of the erased, i.e. unavailable frames. This is done in the so-called frame loss or error concealment unit of the receiver-side signal decoder. The purpose of the frame loss concealment is to make the frame loss as inaudible as possible and hence to mitigate the impact of the frame loss on the reconstructed signal quality as much as possible.

One recent frame loss concealment method for audio is the so-called 'Phase ECU'. This is a method that provides particularly high quality of the restored audio signal after packet or frame loss in case the signal is a music signal. There is also a controlling method disclosed in a previous application that controls the behavior of a frame loss concealment method of Phase-ECU type in response to for instance (statistical) properties of frame losses.

Burstiness of the frame losses is used as one indicator in the controlling method in which response a frame loss concealment method like Phase ECU can be adapted. In general terms, burstiness of frame losses means that there occur several frame losses in a row, making it hard for the frame loss concealment method to use valid recently decoded signal portions for its operation. More specifically, a typical state-of-the art frame loss burstiness indicator is the number n of observed consecutive frame losses. This number can be maintained in a counter which is incremented by one upon each new frame loss and reset to zero upon the reception of a valid frame.

A specific adaptation method of a frame loss concealment method like Phase ECU in response to frame loss burstiness is frequency-selective adjustment of the phases or the spectrum magnitudes of a substitution frame spectrum Z(m), m being a frequency index of a frequency domain transform like the Discrete Fourier Transform (DFT). The magnitude adaptation is done with an attenuation factor $\alpha(m)$ that scales the frequency transform coefficient at index m with increasing frame loss burst counter, n, down to 0. The phase adaptation is done through increasing additive randomization of the phase (with an increasing random phase component $\vartheta(m)$) of the frequency transform coefficient at index m.

Hence, if the original substitution frame spectrum of the Phase ECU follows an expression like $Z(m)=Y(m)\cdot e^{j\theta_k}$, then the adapted substitution frame spectrum follows an expression like $Z(m)=\alpha(m)\cdot Y(m)\cdot e^{j(\theta_k+\vartheta(m))}$.

Herein phase $\theta_k$ with k=1 . . . K is a function of index m and the K spectral peaks identified by the Phase ECU method, and Y(m) is a frequency domain representation (spectrum) of a frame of the previously received audio signal.

Despite the advantages of the above-described adaptation method of the Phase ECU in conditions of burst frame loss, there are still quality shortcomings in case of very long loss burst, e.g. when n greater or equal to 5. In that case the quality of the reconstructed audio signal may e.g. suffer from tonal artifacts, despite the performed phase randomization. At the same time the increasing magnitude attenuation may reduce these audible shortcomings. However, the attenuation of the signal may for long frame loss bursts be perceived as muting or signal drop outs. This may again affect the overall quality of e.g. music or the ambient noise of a speech signal since such signals are sensitive to too strong level variations.

Hence, there is still a need for improved frame loss concealment.

SUMMARY

An object of embodiments herein is to provide efficient frame loss concealment.

According to a first aspect there is presented a method for frame loss concealment. The method is performed by a receiving entity. The method comprises adding, in association with constructing a substitution frame for a lost frame, a noise component to the substitution frame. The noise component has a frequency characteristic corresponding to a low-resolution spectral representation of a signal in a previously received frame.

Advantageously this provides efficient frame loss concealment.

According to a second aspect there is presented a receiving entity for frame loss concealment. The receiving entity comprises processing circuitry. The processing circuitry is configured to cause the receiving entity to perform a set of operations. The set of operations comprises adding, in association with constructing a substitution frame for a lost frame, a noise component to the substitution frame. The noise component has a frequency characteristic corresponding to a low-resolution spectral representation of a signal in a previously received frame.

According to a third aspect there is presented a computer program for frame loss concealment, the computer program comprising computer program code which, when run on a receiving entity, causes the receiving entity to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, embodiments presented herein relate to frame loss concealment, and particularly to a method, a receiving entity, a computer program, and a computer program product for frame loss concealment.

Figure 1:
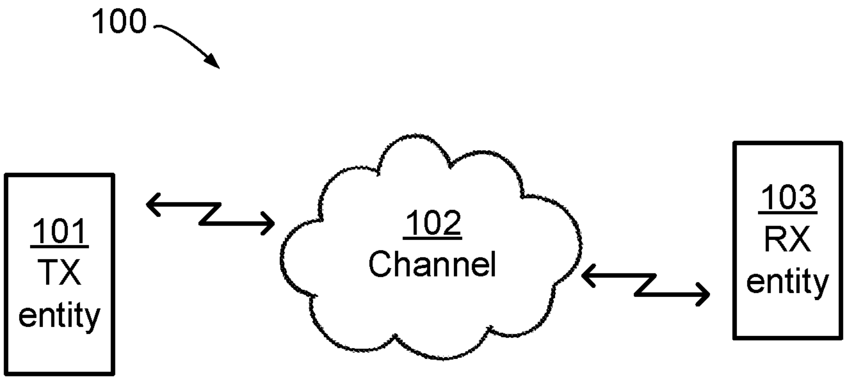
FIG. 1 is a schematic diagram illustrating a communications system according to embodiments.

FIG. 1 schematically illustrates a communication system 100 in which a transmitting (TX) entity 101 is communicating with a receiving (RX) entity 103 over a channel 102. It is assumed that the channel 102 causes frames, or packets, transmitted by the TX entity 101 to the RX entity 103 to be lost. The receiving entity is assumed to be operable to decode audio, such as speech or music, and to be operable to communicate with other nodes or entities, e.g. in the communication system 100. The receiving entity may be a codec, a decoder, a wireless device and/or a stationary device; in fact it could be any type of unit in which it is desirable to handle burst frame errors for audio signals. It could e.g. be a smartphone, a tablet, a computer or any other device capable of wired and/or wireless communication and of decoding of audio. The receiver entity may be denoted e.g. receiving node or receiving arrangement.

Figure 2:
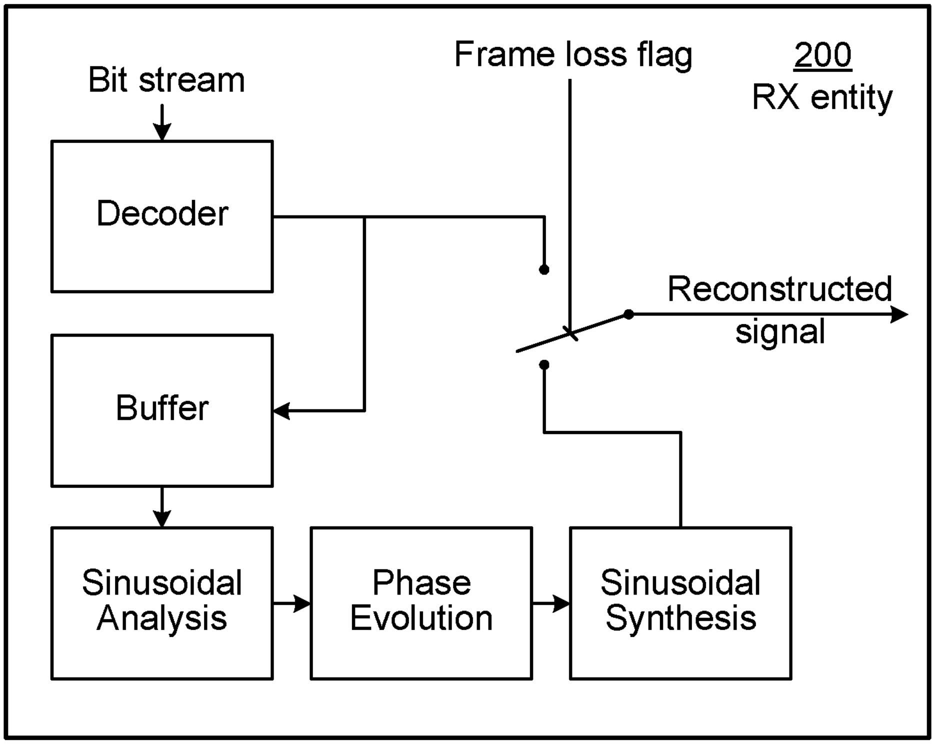
FIG. 2 is a schematic diagram showing functional units of a receiving entity according to an embodiment.

FIG. 2 schematically illustrates functional modules of a known RX entity 200 configured for handling frame losses. An incoming bitstream is decoded by a decoder 201 to form a reconstructed signal and if a frame loss is not detected this reconstructed signal is provided as output from the RX entity 200. The reconstructed signal generated by the decoder 201 is also fed to a buffer 202 for temporary storage. Sinusoidal analysis of the buffered reconstruction signal is performed by a sinusoidal analyzer 203, and phase evolution of the buffered reconstruction signal is performed by a phase evolution unit 204 after which the resulting signal is fed to a sinusoidal synthesizer 205 for generating a substitute reconstruction signal that is output from the RX entity 200 in case of frame loss. Further details of the operations of the RX entity 200 will be provided below.

Figure 3:
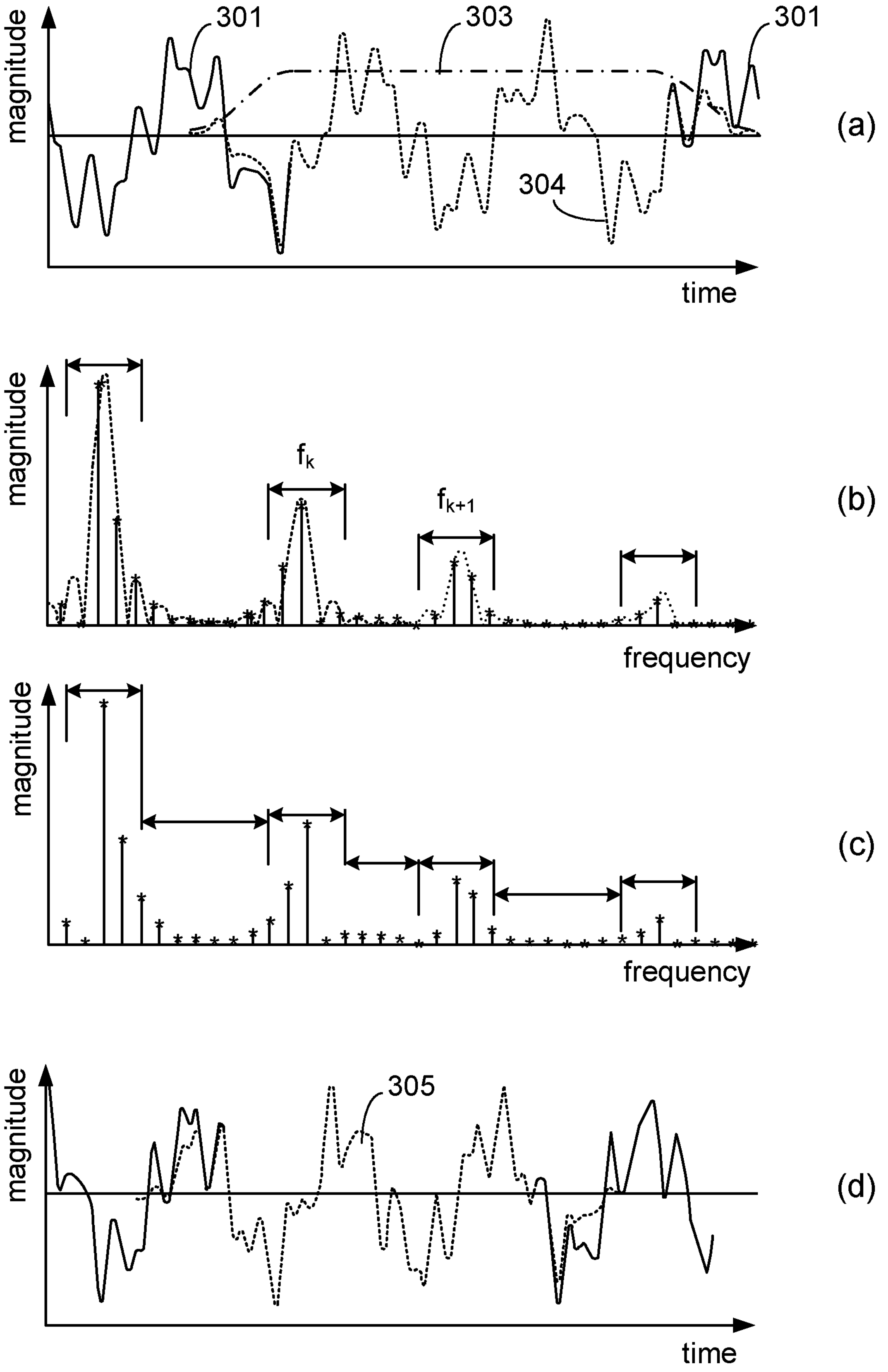
FIG. 3 schematically illustrates substitution frame insertion according to an embodiment.

FIG. 3 at (*a*), (*b*), (*c*), and (*d*) schematically illustrates four stages of a process of creating and inserting a substitution frame in case of frame loss. FIG. 3(*a*) schematically illustrates parts of a previously received signal 301. A window is schematically illustrated at 303. The window is used to extract a frame, a so-called prototype frame 304, of the previously received signal 301; the mid part of the previously received signal 301 is not visible as it is identical to the prototype frame 304 where the window 303 equals 1. FIG. 3(*b*) schematically illustrates the magnitude spectrum, in terms of the discrete Fourier transform (DFT), of the prototype frame in FIG. 3(*a*), where two frequency peaks $f_k$ and $f_{k+1}$ are identified. FIG. 3(*c*) schematically illustrates the frequency spectrum of the generated substitution frame, where phases around the peaks are properly evolved and magnitude spectrum of the prototype frame is retained. FIG. 3(*d*) schematically illustrates the generated substitution frame 305 having been inserted.

In view of the above disclosed mechanisms for frame loss concealment, it has been found that tonal artifacts are caused by too strong periodicity and too sharp spectral peaks of the substitution frame spectrum, despite the randomization.

It is also notable that the mechanisms described in conjunction with an adaptation method of a frame loss concealment method of type Phase ECU also are typical for other frame concealment methods that generate a substitution signal for lost frames either in frequency or time domain. It may therefore be desirable to provide generic mechanisms for frame loss concealment in case of long bursts of lost or corrupted frames.

Besides to provide efficient frame loss concealment, it may also be desirable to find mechanisms that can be implemented with minimum computational complexity as well as with minimum storage requirements.

At least some of the embodiments disclosed herein are based on gradually superposing a substitution signal of a primary frame loss concealment method with a noise signal, where the frequency characteristic of the noise signal is a low-resolution spectral representation of frame of a previously correctly received signal (a "good frame").

Figure 6:
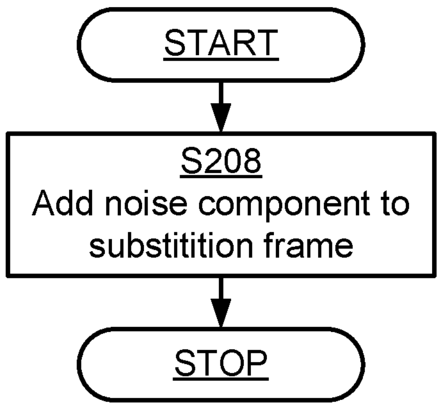

Reference is now made to the flowchart of FIG. 6 disclosing a method for frame loss concealment as performed by a receiving entity according to an embodiment.

The receiving entity is configured to, in a step S208, add, in association with constructing a substitution frame spectrum for a lost frame, a noise component to the substitution frame. The noise component has a frequency characteristic corresponding to a low-resolution spectral representation of a signal in a previously received frame.

In this respect, if the addition in step S208 is performed in the frequency domain the noise component may be regarded as being added to a spectrum of an already generated substitution frame, and hence, the substitution frame to which the noise component has been added may be regarded as a secondary, or further, substitution frame. Thus secondary substitution frame is composed of a primary substitution frame and a noise component. These components are in turn again composed of frequency components.

According to one embodiment, the step S208 of adding the noise component to the substitution frame involves confirming that a burst error length n exceeds a first threshold, T1. One example of the first threshold is to set T1≥2.

Figure 7:
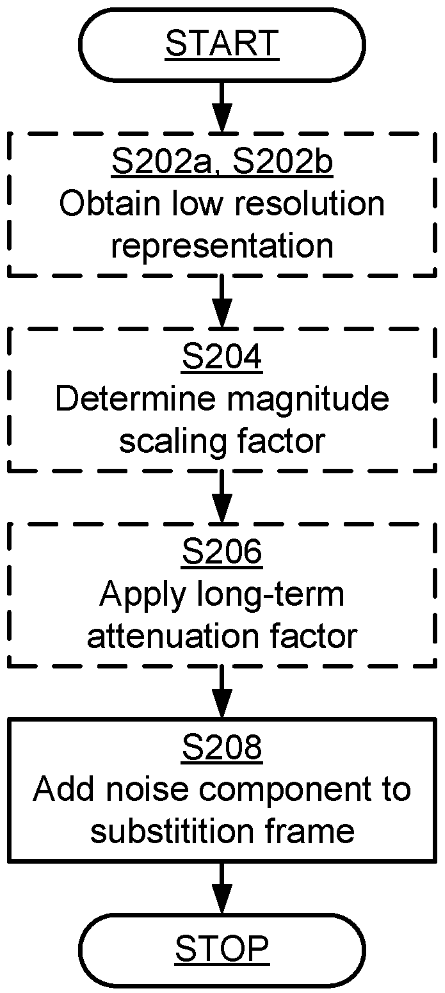

Reference is now made to the flowchart of FIG. 7 disclosing methods for frame loss concealment as performed by a receiving entity according to further embodiments.

According to a first preferred embodiment, the substitution signal for a lost frame is generated by a primary frame loss concealment method, superposed with a noise signal. With increasing number of frame losses in a row, the substitution signal of the primary frame loss concealment is gradually attenuated, preferably according to the muting behavior of the primary frame loss concealment method in case of burst frame loss. At the same time, the frame energy loss due to the muting behavior of the primary frame loss concealment method is compensated for through the addition of a noise signal with similar spectral characteristics like a frame of a previously received signal, e.g. the last correctly received frame.

Therefore, the noise component and the substitution frame spectrum may be scaled with scale factors being dependent on the number of consecutively lost frames such that the noise component is gradually superimposed on the substitution frame spectrum with increasing magnitude as a function of the number of consecutively lost frames.

As will be further disclosed below, the substitution frame spectrum may be gradually attenuated by an attenuation factor α(m).

The substitution frame spectrum and the noise component may be superimposed in frequency domain. Alternatively, the low-resolution spectral representation is based on a set of linear predictive coding (LPC) parameters and the noise component may thus be superimposed in time domain. For further disclosure of how to apply LPC parameters, see below.

More specifically, the primary frame loss concealment method may be a method of Phase ECU type with an adaptation characteristic in response to burst loss as described above. That is, the substitution frame component may be derived by a primary frame loss concealment method, such as Phase ECU.

In that case the signal generated by the primary frame loss concealment method is of type $Z(m)=\alpha(m)\cdot Y(m)\cdot e^{j(\theta_k+\vartheta(m))}$, where α(m) and ϑ(m) are magnitude attenuation and phase randomization terms. That is, the substitution frame spectrum may have a phase and the phase may superimposed with a random phase value ϑ(m).

And, as described above, phase $\theta_k$ with k=1 . . . K is a function of index m and the K spectral peaks identified by the Phase ECU method, and Y(m) is a frequency domain representation (spectrum) of a frame of the previously received audio signal.

As suggested herein, this spectrum may then be further modified by an additive noise component $\beta(m)\cdot e^{j\eta(m))}$, yielding a combined component $\beta(m)\cdot\overline{Y}(m)\cdot e^{j\eta(m))}$, where $\overline{Y}(m)$ is a magnitude spectrum representation of a previously received "good frame", i.e. a frame of an at least relatively correctly received signal. Thereby, the noise component may be provided with a random phase value η(m).

In this way the spectral coefficient for spectrum index m follows an expression:

$$Z(m)=\alpha(m)\cdot Y(m)\cdot e^{j(\theta_k+\vartheta(m))}+\beta(m)\cdot\overline{Y}(m)\cdot e^{j\eta(m))}.$$

Here β(m) is a magnitude scaling factor and η(m) is a random phase. Hence, the additive noise component consists of scaled random-phase spectral coefficients of the magnitude spectrum $\overline{Y}(m)$. According to the invention, β(m) may be chosen such that it compensates for the energy loss when applying the attenuation factor α(m) to spectral coefficient Y(m) of the substitution frame spectrum of the primary frame loss concealment. Hence, the receiving entity may be configured to, in an optional step S204, determine a magnitude scaling factor β(m) for the noise component such that β(m) compensates for energy loss resulting from applying the attenuation factor α(m) to the substitution frame spectrum.

Under the assumption that the random phase terms decorrelate the two additive terms $\alpha(m)\cdot Y(m)\cdot e^{j(\theta_k+\vartheta(m))}$ and $\beta(m)\cdot\overline{Y}(m)\cdot e^{j\eta(m))}$ of the equation above, β(m) may e.g. be determined as $$\beta(m)=\sqrt{1-\alpha^2(m)}.$$

In order to avoid the above-described issue with tonal artifacts arising from too sharp spectral peaks, while still maintaining the overall frequency characteristic of the signal prior to the burst frame loss, the magnitude spectrum representation $\overline{Y}(m)$ is a low-resolution representation. It has been found that a very suitable low-resolution representation of the magnitude spectrum is obtained by frequency-group-wise averaging the magnitude spectrum |Y(m)| of a frame of the previously received signal, e.g. a correctly received frame, a "good" frame. The receiving entity may be configured to, in an optional step S202*a*, obtain the low-resolution representation of the magnitude spectrum by frequency-group-wise averaging the magnitude spectrum of the signal in the previously received frame. The low-resolution spectral representation may be based on a magnitude spectrum of the signal in the previously received frame.

Let $I_k=[m_{k-1}+1, \ldots, m_k]$ specify the $k^{th}$ interval, k=1 . . . K, covering the DFT bins from $m_{k-1}+1$ to $m_k$, then these intervals define K frequency bands. The frequency-group-wise averaging for band k can then be done by averaging the squares of the magnitudes of the spectral coefficients in that band and calculating the square root thereof:

$$\bar{Y}_k = \sqrt{\frac{1}{|I_k|}\sum_{m\in I_k}|Y(m)|^2}$$

Here $|I_k|$ denotes the size of the frequency group k, i.e. the number of included frequency bins. It is to be noted that the interval $I_k=[m_{k-1}+1, \ldots, m_k]$ corresponds to the frequency band $$B_k = \left[\frac{m_{k-1}+1}{N}\cdot f_s, \ldots, \frac{m_k}{N}\cdot f_s\right],$$

where $f_s$ denotes the audio sampling frequency and N the block length of the used frequency domain transform.

An exemplifying suitable choice for the frequency band sizes or widths is either to make them equal size with e.g. a width of several 100 Hz. Another exemplifying way is to make the frequency band widths following the size of the human auditory critical bands, i.e. to relate them to the frequency resolution of the human auditory system. That is, group widths used during the frequency-group-wise averaging may follow human auditory critical bands. This means approximately to make the frequency band widths equal for frequencies up to 1 kHz and to increase them exponentially above 1 kHz. Exponential increase means for instance to double the frequency bandwidth when incrementing the band index k.

A further exemplifying specific embodiment of calculating the low-resolution magnitude spectrum coefficients $\bar{Y}_k$ is to base it on a multitude n of low-resolution frequency domain transforms of the previously received signal. The receiving entity may thus be configured to, in an optional step S202*b*, obtain the low-resolution representation of said magnitude spectrum by frequency-group-wise averaging a multitude n of low-resolution frequency domain transforms of the signal in the previously received frame. An exemplifying suitable choice of n is n=2.

According to this embodiment firstly the squared magnitude spectra of a left part (subframe) and a right part (subframe) of a frame of the previously received signal are calculated, e.g. of the most recently received good frame. A frame here could be the size of the audio segments or frames used in transmission, or a frame could be of some other size, e.g. a size constructed and used by a phase ECU, which may construct own frames with different length from the reconstructed signal. The block length $N_{part}$ of these low-resolution transforms may be a fraction (e.g. ¼) of the original frame size of the primary frame loss concealment method. Then, secondly, the frequency-group-wise low resolution magnitude spectrum coefficients are calculated by frequency-group-wise averaging the squared spectral magnitudes from the left and the right subframes, and finally calculating the square-root thereof:

$$\bar{Y}_k = \sqrt{\frac{1}{2\cdot|I_k|}\left(\sum_{m\in I_k}|Y_{left}(m)|^2 + \sum_{m\in I_k}|Y_{right}(m)|^2\right)}$$

The coefficients of the low-resolution magnitude spectrum $\bar{Y}(m)$ are then obtained from the K frequency group representatives:

$$\bar{Y}(m)=\bar{Y}_k \text{ for } m\in I_k, k=1 \ldots K.$$

There are various advantages with this approach of calculating the low-resolution magnitude spectrum coefficient $\bar{Y}_k$; the use of two short frequency domain transforms is preferable in terms of computational complexity over a single frequency domain transform with a large block length. Moreover, the averaging stabilizes the estimation of the spectrum, i.e. it reduces statistical fluctuations that could impact the achievable quality. A specific advantage when applying this embodiment in conjunction with the previously mentioned Phase ECU controller is that it can rely on the spectral analyses related to the detection of a transient condition in the frame of a previously received signal, the "good frame". This reduces the computational overhead associated with the invention even further.

The objective of providing a mechanism with minimum storage requirements is also achieved, as this embodiment allows representing the low-resolution spectrum with only K values, where K can practically be as low as e.g. 7 or 8.

It has further been found that the quality of the reconstructed audio signal in case of long loss bursts can be further enhanced if the frequency-group-wise superposition with a noise signal imposes a certain degree of low-pass characteristic. Hence, a low-pass characteristic may be imposed on the low-resolution spectral representation.

Such a characteristic effectively avoids unpleasant high-frequency noise in the substitution signal. More specifically, this is achieved by introducing an additional attenuation through a factor λ(m) of the noise signal for higher frequencies. Compared to the above described calculation of the noise scaling factor β(m) this factor is now calculated according to $$\beta(m)=\lambda(m)\cdot\sqrt{1-\alpha^2(m)}.$$

Herein the factor λ(m) could equal 1 for small m and be less than 1 for large m. That is, β(m) may determined as $(m)=\lambda(m)\cdot\sqrt{1-\alpha^2(m)}$, where λ(m) is a frequency dependent attenuation factor. For example, λ(m) may be equal to 1 for m below a threshold and λ(m) may be less than 1 for m above this threshold.

It should be noted that preferably the scaling factors α(m) and β(m) are frequency-group-wise constant. This helps to reduce complexity and storage requirements. In that case also the factor λ is applied frequency-group-wisely according to the following expression:

$$\beta_k=\lambda_k\cdot\sqrt{1-\alpha_k^2}.$$

It has been found beneficial to set $\lambda_k$ such that it is 0.1 for frequency bands above 8000 Hz and 0.5 for a frequency band from 4000 Hz-8000 Hz. For lower frequency bands $\lambda_k$ is equal to 1. Other values are also possible.

It has further been found beneficial despite the quality advantages of the proposed method with superposition of the substitution signal of a primary frame loss concealment method with a noise signal, to enforce a muting characteristic for extremely long frame loss bursts of e.g. n>10 (corresponding to 200 ms or more). Therefore, the receiving entity may be configured to, in an optional step S206, apply a long-term attenuation factor γ to β(m) when the burst error length n exceeds a second threshold T2 at least as large as the first threshold T1. According to one example, T2≥10.

In more detail, in case a sustained noise signal synthesis could be annoying to a listener. In order to solve this issue the additive noise signal may thus be attenuated starting from loss bursts of larger than e.g. n=10. Specifically, a further long-term attenuation factor γ (e.g. γ=0.5) and a threshold thresh is introduced with which the noise signal is attenuated if the loss burst length n exceeds thresh. This leads to the following modification of the noise scaling factor:

$$\beta_\gamma(m)=\gamma^{max(0,n-thresh)}\cdot\beta(m)$$

The characteristic that is achieved by that modification is that the noise signal is attenuated with $\gamma^{n-thresh}$ if n exceeds the threshold. As an example, if n=20 (400 ms) and γ=0.5 and T2=thresh=10, then the noise signal is scaled down to approximately 1/1000.

It is to be noted that again, the operation can also be done frequency-group-wise, as in the embodiment above.

To summarize, according to at least some embodiments, Z(m) represents the spectrum of a substitution frame and this spectrum is generated by use of a primary frame loss concealment method, such as the Phase ECU, based on the spectrum Y(m) of a prototype frame, i.e. a frame of the previously received signal.

For long loss bursts, the original phase ECU with described controller essentially attenuates this spectrum and randomizes the phases. For very large n this means that the generated signal is completely muted.

As herein disclosed this attenuation is compensated for by adding a suitable amount of spectrally-shape noise. Hence, the level of the signal remains essentially stable, even for n>5. For extremely long loss bursts, e.g. n>10, an embodiment involves attenuating/muting even this additive noise.

According to a further embodiment the additive low-resolution noise signal spectrum $\overline{Y}(m)$ may be representated by a set of LPC parameters, and hence the spectrum in this case corresponds to the spectrum of an LPC synthesis filter with these LPC parameters as coefficient. Such an embodiment may be preferred if the primary PLC method is not of Phase ECU type and rather e.g. a method operating in the time domain. In that case a time signal corresponding to the additive low-resolution noise signal spectrum $\overline{Y}(m)$ could preferably also be generated in time domain, by filtering white noise through the synthesis filter with said LPC coefficients.

The adding of the noise component to the substitution frame as in step S208 may, for example, be performed either in frequency domain or in time domain or further equivalent signal domains. For example, there are signal domains like quadrature mirror filter (QMF) or sub band filter domain in which the primary frame loss concealment methods might operate. In such cases, it may be preferred to generate an additive noise signal corresponding to the described low-resolution noise signal spectrum $\overline{Y}(m)$ in these corresponding signal domains. Apart from the differences of the signal domain in which the noise signal is added, the above embodiments remain applicable.

Figure 5:
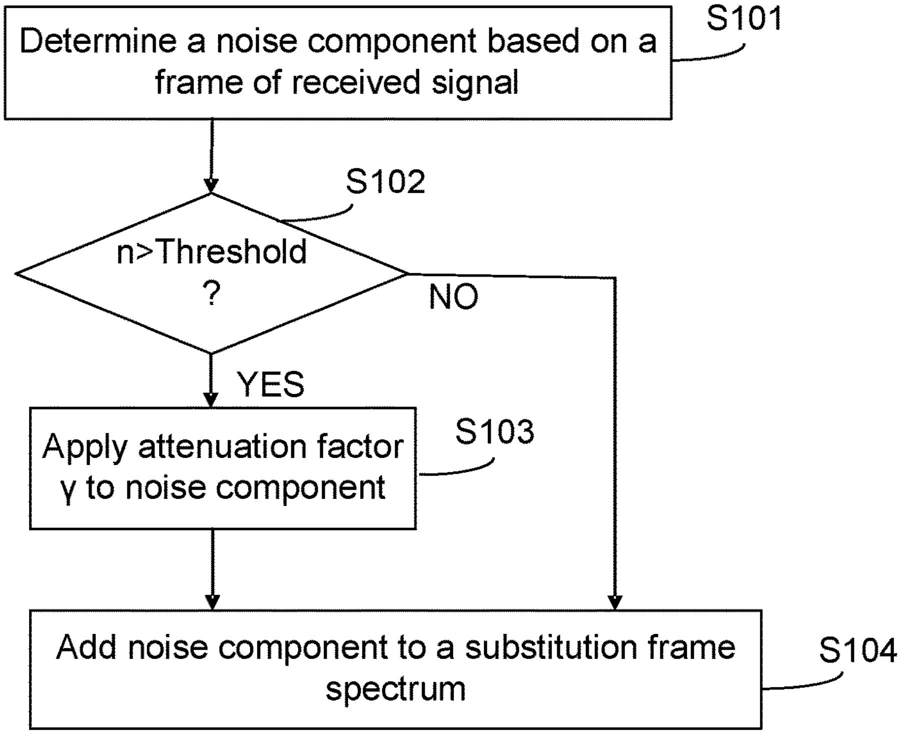
FIGS. 5, 6, and 7 are flowcharts of methods according to embodiments.

Reference is now made to the flowchart of FIG. 5 disclosing a method for frame loss concealment as performed by a receiving entity according to one particular embodiment.

In an action S101 a noise component may be determined, where the frequency characteristic of the noise component is a low-resolution spectral representation of a frame of a previously received signal. The noise component may e.g. be composed and denoted as $\beta(m)\cdot\overline{Y}(m)\cdot e^{j\eta(m))}$, where β(m) may be a magnitude scaling factor and η(m) may be a random phase, and $\overline{Y}(m)$ may be a magnitude spectrum representation of a previously received "good frame".

In an optional action S103, it could be determined whether a number, n, of lost or erroneous frames exceeds a threshold. The threshold could be e.g. 8, 9, 10 or 11 frames. When n is lower than the threshold, the noise component is added to a substitution frame spectrum Z in an action S104. The substitution frame spectrum Z may be derived by a primary frame loss concealment method, such as e.g. Phase ECU. When the number of lost frames n exceeds the threshold, an attenuation factor γ may be applied to the noise component. The attenuation factor may be constant within certain frequency ranges. When having applied the attenuation factor γ, the noise component may be added to a substitution frame spectrum Z in action S104.

Embodiments described herein also relate to a receiving entity, or receiving node, which will be described below with reference to FIGS. 4, 8 and 9. The receiving entity will be described in brief in order to avoid unnecessary repetition.

A receiving entity may be configured to perform one or more of the embodiments described herein.

Figure 4:
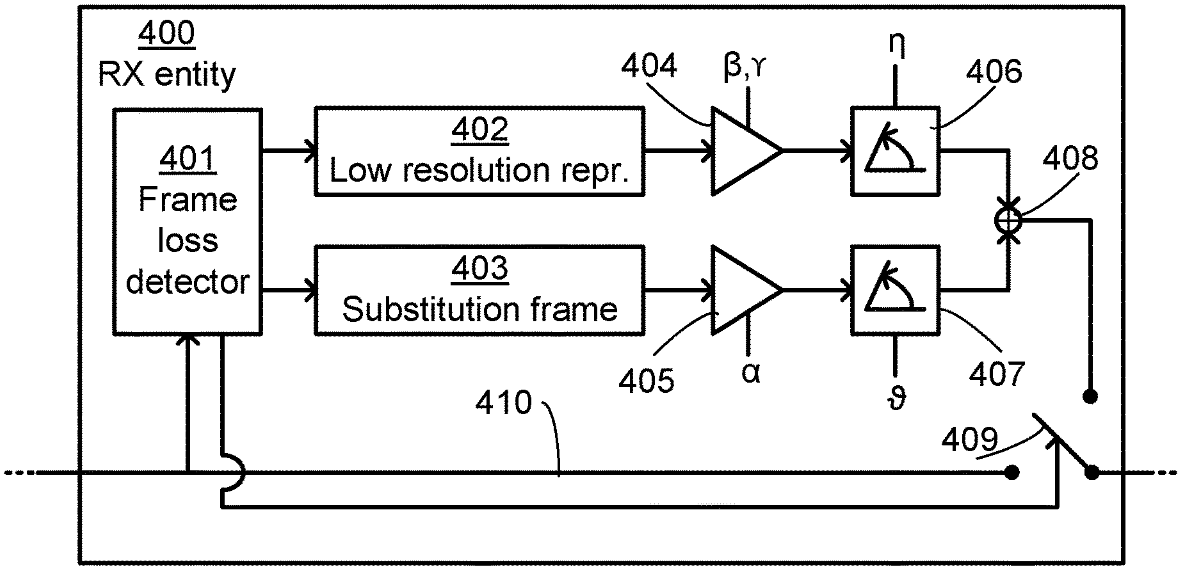
FIG. 4 is a schematic diagram showing functional units of a receiving entity according to an embodiment.

FIG. 4 schematically discloses functional modules of a receiving entity 400 according to an embodiment. The receiving entity 400 comprises a frame loss detector 401 configured to detect a frame loss in a signal received along signal path 410. The frame loss detector interfaces a low resolution representation generator 402 and a substitution frame generator 403. The low resolution representation generator 402 is configured to generate low-resolution spectral representation of a signal in a previously received frame. The substitution frame generator 403 is configured to generate a substitution frame according to known mechanisms, such as Phase ECU. Functional blocks 404 and 405 represents scaling of the signals generated by the low resolution representation generator 402 and the substitution frame generator 403, respectively, with the above disclosed scale factors β, γ, and α. Functional blocks 406 and 407 represents superimposing the thus scaled signals with the above disclosed phase values η and ϑ. Functional block 408 represents an adder for adding the thus generated noise component to the substitution frame. Functional block 409 represents a switch as controlled by the frame loss detector 401 for replacing a lost frame with a generated substitution frame. As noted above, there are many domains in which the operations, such as the adding in step S208, may be performed. Hence, any of the above disclosed functional blocks may be configured to perform operations in any of these domains.

Below, an exemplifying receiving entity 800, adapted to enable the performance of an above described method for handling of burst frame errors will be described with reference to FIG. 8.

The part of the receiving entity which is mostly related to the herein suggested solution is illustrated as an arrangement 801 surrounded by a dashed line. The arrangement and possibly other parts of the receiving entity are adapted to enable the performance of one or more of the procedures described above and illustrated e.g. in FIGS. 5, 6, and 7. The receiving entity 800 is illustrated as to communicate with other entities via a communication unit 802, which may be considered to comprise conventional means for wireless and/or wired communication in accordance with a communication standard or protocol within which the receiving entity is operable. The arrangement and/or receiving entity may further comprise other functional units 807, for providing e.g. regular receiving entity functions, such as e.g. signal processing in association with decoding of audio, such as speech and/or music.

The arrangement part of the receiving entity may be implemented and/or described as follows:

The arrangement comprises processing means 803, such as a processor, and a memory 804 for storing instructions. The memory comprises instructions in the form of a computer program 805, which when executed by the processing means causes the receiving entity or arrangement to perform methods as herein disclosed.

Figure 9:
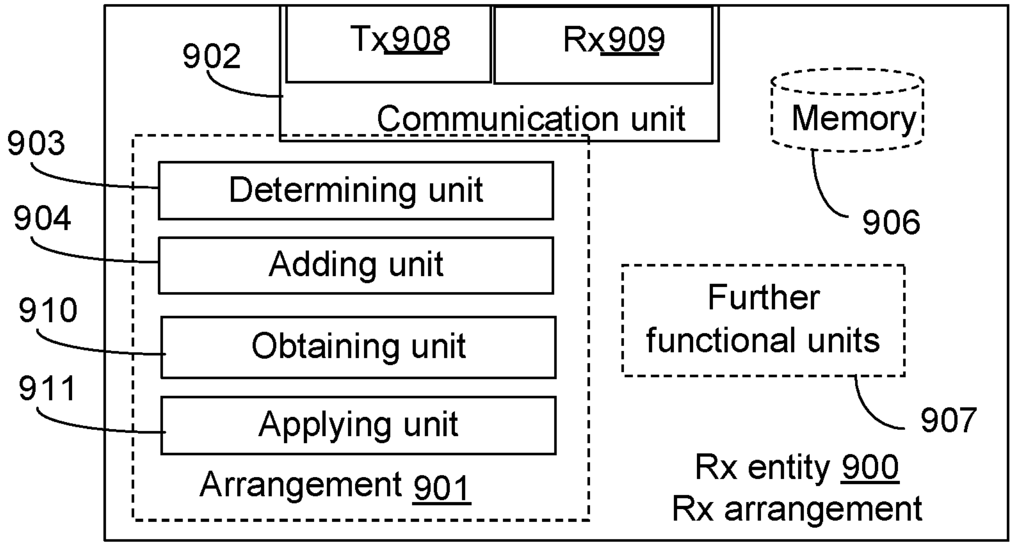
FIG. 9 is a schematic diagram showing functional modules of a receiving entity according to an embodiment.

An alternative embodiment of the receiving entity 800 is shown in FIG. 9. FIG. 9 illustrates a receiving entity 900, operable to decode an audio signal.

An arrangement 901 may be implemented and/or schematically described as follows. The arrangement 901 may comprise a determining unit 903, configured to determine a noise component with a frequency characteristic of a low-resolution spectral representation of a frame of a previously received signal and for determining a magnitude scaling factor. The arrangement may further comprise an adding unit 904, configured to add the noise component to a substitution frame spectrum. The arrangement may further comprise an obtaining unit 910, configured to obtain the low-resolution representation of the magnitude spectrum of the signal in the previously received frame. The arrangement may further comprise an applying unit 911, configured to apply a long-term attenuation factor. The receiving entity may comprise further units 907 configured for e.g. determining a scaling factor β(m) for the noise component. The receiving entity 900 further comprises a communication unit 902 having a transmitter (Tx) 908 and a receiver (Rx) 909 with functionality as the communication unit 802. The receiving entity 900 further comprises a memory 906 with functionality as the memory 804.

Figure 8:
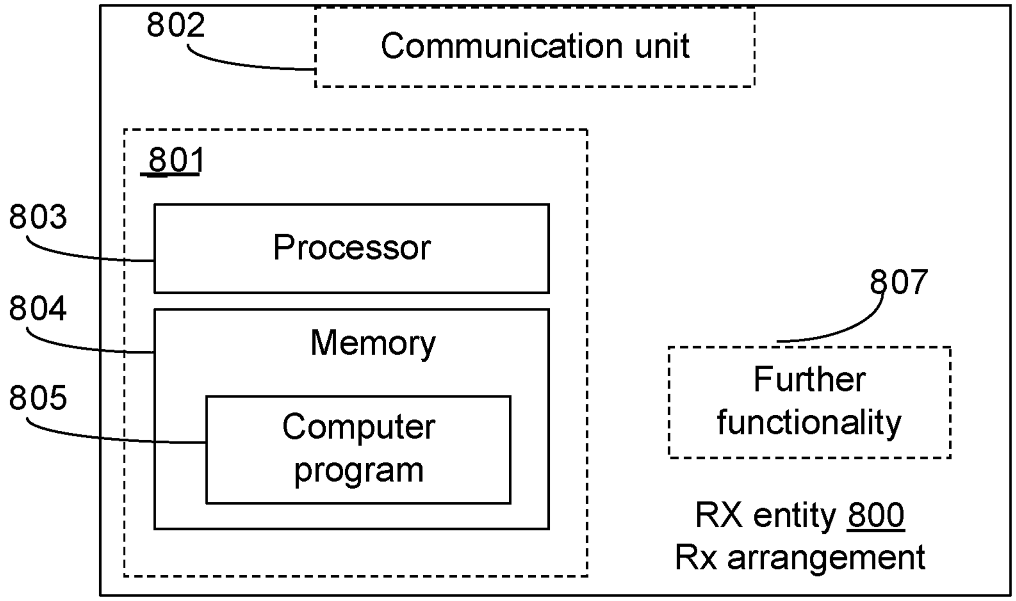
FIG. 8 is a schematic diagram showing functional units of a receiving entity according to an embodiment.

The units or modules in the arrangements described above could be implemented e.g. by one or more of: a processor or a micro-processor and adequate software and memory for storing thereof, a Programmable Logic Device (PLD) or other electronic component(s) or processing circuitry configured to perform the actions described above, and illustrated e.g. in FIG. 8. That is, the units or modules in the arrangements described above could be implemented by a combination of analog and digital circuits, and/or one or more processors configured with software and/or firmware, e.g. stored in a memory. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 10:
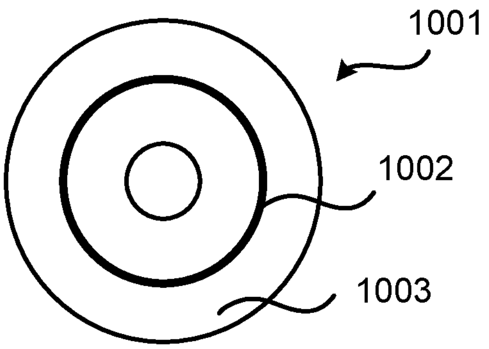
FIG. 10 shows one example of a computer program product comprising computer readable means according to an embodiment.

FIG. 10 shows one example of a computer program product 1000 comprising computer readable means 1001. On this computer readable means 1001, a computer program 1002 can be stored, which computer program 1002 can cause the processing circuitry 803 and thereto operatively coupled entities and devices, such as the communications unit 802 and the storage medium 804, to execute methods according to embodiments described herein. The computer program 1002 and/or computer program product 1001 may thus provide means for performing any steps as herein disclosed.

In the example of FIG. 10, the computer program product 1001 is illustrated as an optical disc, such as a CD (compact disc) or a DVD (digital versatile disc) or a Blu-Ray disc. The computer program product 1001 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1002 is here schematically shown as a track on the depicted optical disk, the computer program 1002 can be stored in any way which is suitable for the computer program product 1001.

Some definitions of possible features and embodiments are outlined below, partly referring to the flowchart of FIG. 5.

A method performed by a receiving entity for improving frame loss concealment or handling of burst frame errors, the method comprising: in association with constructing a substitution frame spectrum Z adding (action 104) a noise component to the substitution frame spectrum Z, where the frequency characteristic of the noise component is a low-resolution spectral representation of a frame of a previously received signal.

In a possible embodiment, the low-resolution spectral representation is based on a magnitude spectrum of a frame of a previously received signal. A low-resolution representation of a magnitude spectrum may be obtained e.g. by frequency-group-wise averaging of the magnitude spectrum of a frame of the previously received signal. Alternatively a low-resolution representation of a magnitude spectrum may be based on a multitude n of low-resolution frequency domain transforms of the previously received signal In a possible embodiment, the low-resolution spectral representation is based on a set of linear predictive coding (LPC) parameters.

In a possible embodiment where the substitution frame spectrum Z is gradually attenuated by an attenuation factor α(m), the method comprises determining a magnitude scaling factor β(m) for the noise component, such that β(m) compensates for energy loss resulting from applying of the attenuation factor α(m). β(m) may e.g. be determined as $$\beta(m)=\sqrt{1-\alpha^2(m)}.$$

In a possible embodiment, β(m) is derived as (m)=β(m)·$\sqrt{1-\alpha^2(m)}$, where the factor λ(m) is an attenuation factor for certain frequencies of the noise signal, e.g. higher frequencies. λ(m) may equal 1 for small m and be less than 1 for large m.

In a possible embodiment, the scaling factors α(m) and β(m) are frequency-group-wise constant.

In a possible embodiment the method comprises applying (action 103) an attenuation factor, γ, when a burst error length exceeds a threshold.

The substitution frame spectrum Z may be derived by a primary frame loss concealment method, such as Phase ECU.

The different embodiments may be combined in any suitable way.

Below, information on exemplifying embodiments of the frame loss concealment method Phase ECU will be provided, although the term "Phase ECU" will not be explicitly mentioned. Phase ECU has been mentioned herein e.g. in terms of the primary frame loss concealment method, for deriving of Z before adding the noise component.

A concept of the embodiments described hereinafter comprises a concealment of a lost audio frame by:

performing a sinusoidal analysis of at least part of a previously received or reconstructed audio signal, wherein the sinusoidal analysis involves identifying frequencies of sinusoidal components of the audio signal;

applying a sinusoidal model on a segment of the previously received or reconstructed audio signal, wherein said segment is used as a prototype frame in order to create a substitution frame for a lost frame, and creating the substitution frame involving time-evolution of sinusoidal components of the prototype frame, up to the time instance of the lost audio frame, in response to the corresponding identified frequencies.

Sinusoidal Analysis

The frame loss concealment according to embodiments involves a sinusoidal analysis of a part of a previously received or reconstructed audio signal. The purpose of this sinusoidal analysis is to find the frequencies of the main sinusoidal components, i.e. sinusoids, of that signal. Hereby, the underlying assumption is that the audio signal was generated by a sinusoidal model and that it is composed of a limited number of individual sinusoids, i.e. that it is a multi-sine signal of the following type:

$$s(n) = \sum_{k=1}^{K} a_k \cdot \cos\left(2\pi \frac{f_k}{f_s} \cdot n + \varphi_k\right)$$

In this equation K is the number of sinusoids that the signal is assumed to consist of. For each of the sinusoids with index k=1 . . . K, $a_k$ is the amplitude, $f_k$ is the frequency, and $\varphi_k$ is the phase. The sampling frequency is denominated by $f_s$ and the time index of the time discrete signal samples s(n) by n.

It may be beneficial, or even important, to find as exact frequencies of the sinusoids as possible. While an ideal sinusoidal signal would have a line spectrum with line frequencies $f_k$, finding their true values would in principle require infinite measurement time. Hence, it is in practice difficult to find these frequencies, since they can only be estimated based on a short measurement period, which corresponds to the signal segment used for the sinusoidal analysis according to embodiments described herein; this signal segment is hereinafter referred to as an analysis frame. Another difficulty is that the signal may in practice be time-variant, meaning that the parameters of the above equation vary over time. Hence, on the one hand it is desirable to use a long analysis frame making the measurement more accurate; on the other hand a short measurement period would be needed in order to better cope with possible signal variations. A good trade-off is to use an analysis frame length in the order of e.g. 20-40 ms.

According to a preferred embodiment, the frequencies of the sinusoids $f_k$ are identified by a frequency domain analysis of the analysis frame. To this end, the analysis frame is transformed into the frequency domain, e.g. by means of DFT (Discrete Fourier Transform) or DCT (Discrete Cosine Transform), or a similar frequency domain transform. In case a DFT of the analysis frame is used, the spectrum X(m) at discrete frequency index m is given by:

$$X(m) = DFT(w(n) \cdot x(n)) = \sum_{n=0}^{L-1} e^{-j\frac{2\pi}{L}mn} \cdot w(n) \cdot x(n)$$

In this equation, w(n) denotes the window function with which the analysis frame of length L is extracted and weighted; j is the imaginary unit and e is the exponential function.

A typical window function is a rectangular window which is equal to 1 for n∈[0 . . . L−1] and otherwise 0. It is assumed that the time indexes of the previously received audio signal are set such that the prototype frame is referenced by the time indexes n=0 . . . L−1. Other window functions that may be more suitable for spectral analysis are e.g. Hamming, Hanning, Kaiser or Blackman.

Another window function is a combination of the Hamming window and the rectangular window. Such a window may have a rising edge shape like the left half of a Hamming window of length L1 and a falling edge shape like the right half of a Hamming window of length L1 and between the rising and falling edges the window is equal to i for the length of L−L1.

The peaks of the magnitude spectrum of the windowed analysis frame |X(m)| constitute an approximation of the required sinusoidal frequencies $f_k$. The accuracy of this approximation is however limited by the frequency spacing of the DFT. With the DFT with block length L the accuracy is limited to $$\frac{f_s}{2L}.$$

However, this level of accuracy may be too low in the scope of the method according the embodiments described herein, and an improved accuracy can be obtained based on the results of the following consideration:

The spectrum of the windowed analysis frame is given by the convolution of the spectrum of the window function with the line spectrum of a sinusoidal model signal S(Ω), subsequently sampled at the grid points of the DFT:

$$X(m) = \int_{2\pi} \delta\left(\Omega - m \cdot \frac{2\pi}{L}\right) \cdot (W(\Omega) * S(\Omega)) \cdot d\Omega.$$

In this equation, δ represents the Dirac delta function and the symbol * denotes convolution operation. By using the spectrum expression of the sinusoidal model signal, this can be written as $$X(m) = \frac{1}{2} \int_{2\pi} \delta\left(\Omega - m \cdot \frac{2\pi}{L}\right) \cdot \sum_{k=1}^{K} a_k \cdot \left(\left(W\left(\Omega + 2\pi \frac{f_k}{f_s}\right) \cdot e^{-j\varphi_k} + W\left(\Omega - 2\pi \frac{f_k}{f_s}\right) \cdot e^{j\varphi_k}\right) \cdot d\Omega\right.$$

Hence, the sampled spectrum is given by $$X(m) = \frac{1}{2} \sum_{k=1}^{K} a_k \cdot \left(\left(W\left(2\pi\left(\frac{m}{L} + \frac{f_k}{f_s}\right)\right) \cdot e^{-j\varphi_k} + W\left(2\pi\left(\frac{m}{L} - \frac{f_k}{f_s}\right)\right) \cdot e^{j\varphi_k}\right)\right)$$

with m=0 . . . L−1. Based on this, the observed peaks in the magnitude spectrum of the analysis frame stem from a windowed sinusoidal signal with K sinusoids, where the true sinusoid frequencies are found in the vicinity of the peaks.

Thus, the identifying of frequencies of sinusoidal components may further involve identifying frequencies in the vicinity of the peaks of the spectrum related to the used frequency domain transform.

If $m_k$ is assumed to be a DFT index (grid point) of the observed $k^{th}$ peak, then the corresponding frequency is $$\hat{f}_k = \frac{m_k}{L}\cdot f_s$$

which can be regarded an approximation of the true sinusoidal frequency $f_k$. The true sinusoid frequency $f_k$ can be assumed to lie within the interval:

$$\left[\left(m_k - \frac{1}{2}\right)\cdot\frac{f_s}{L},\ \left(m_k + \frac{1}{2}\right)\cdot\frac{f_s}{L}\right].$$

For clarity it is noted that the convolution of the spectrum of the window function with the spectrum of the line spectrum of the sinusoidal model signal can be understood as a superposition of frequency-shifted versions of the window function spectrum, whereby the shift frequencies are the frequencies of the sinusoids. This superposition is then sampled at the DFT grid points.

Based on the above discussion, a better approximation of the true sinusoidal frequencies may be found by increasing the resolution of the search, such that it is larger than the frequency resolution of the used frequency domain transform.

Thus, the identifying of frequencies of sinusoidal components is preferably performed with higher resolution than the frequency resolution of the used frequency domain transform, and the identifying may further involve interpolation.

One exemplary preferred way to find a better approximation of the frequencies $f_k$ of the sinusoids is to apply parabolic interpolation. One approach is to fit parabolas through the grid points of the DFT magnitude spectrum that surround the peaks and to calculate the respective frequencies belonging to the parabola maxima, and an exemplary suitable choice for the order of the parabolas is 2. In more detail, the following procedure may be applied:

1) Identifying the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2) For each peak k (with k=1 . . . K) with corresponding DFT index $m_k$, fitting a parabola through the three points $\{P_1; P_2; P_3\}=\{(m_k-1, \log(|X(m_k-1)|); (m_k, \log(|X(m_k)|); (m_k+1, \log(|X(m_k+1)|)\}$, where log denotes the logarithm operator. This results in parabola coefficients $b_k(0)$, $b_k(1)$, $b_k(2)$ of the parabola defined by $$p_k(q) = \sum_{i=0}^{2} b_k(i)\cdot q^i.$$

3) For each of the K parabolas, calculating the interpolated frequency index $\hat{m}_k$ corresponding to the value of q for which the parabola has its maximum, wherein $\hat{f}_k=\hat{m}_k\cdot f_s/L$ is used as an approximation for the sinusoid frequency $f_k$.

Applying a Sinusoidal Model

The application of a sinusoidal model in order to perform a frame loss concealment operation according to embodiments may be described as follows:

In case a given segment of the coded signal cannot be reconstructed by the decoder since the corresponding encoded information is not available, i.e. since a frame has been lost, an available part of the signal prior to this segment may be used as prototype frame. If y(n) with n=0 . . . N−1 is the unavailable segment for which a substitution frame z(n) has to be generated, and y(n) with n<0 is the available previously decoded signal, a prototype frame of the available signal of length L and start index $n_{-1}$ is extracted with a window function w(n) and transformed into frequency domain, e.g. by means of DFT:

$$Y_{-1}(m) = \sum_{n=0}^{L-1} y(n-n_{-1})\cdot w(n)\cdot e^{-j\frac{2\pi}{L}nm}.$$

The window function can be one of the window functions described above in the sinusoidal analysis. Preferably, in order to save numerical complexity, the frequency domain transformed frame should be identical with the one used during sinusoidal analysis.

In a next step the sinusoidal model assumption is applied. According to the sinusoidal model assumption, the DFT of the prototype frame can be written as follows:

$$Y_{-1}(m) = \frac{1}{2}\sum_{k=1}^{K} a_k\cdot\left(\left(W\left(2\pi\left(\frac{m}{L}+\frac{f_k}{f_s}\right)\right)\cdot e^{-j\phi_k} + W\left(2\pi\left(\frac{m}{L}-\frac{f_k}{f_s}\right)\right)\cdot e^{j\varphi_k}\right)\right).$$

This expression was also used in the analysis part and is described in detail above.

Next, it is realized that the spectrum of the used window function has only a significant contribution in a frequency range close to zero. The magnitude spectrum of the window function is large for frequencies close to zero and small otherwise (within the normalized frequency range from −π to π, corresponding to half the sampling frequency. Hence, as an approximation it is assumed that the window spectrum W(m) is non-zero only for an interval $M=[-m_{min}, m_{max}]$, with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e. from one shifted window spectrum. This means that the expression above reduces to the following approximate expression:

$$\hat{Y}_{-1}(m) = \frac{a_k}{2}\cdot W\left(2\pi\left(\frac{m}{L}-\frac{f_k}{f_0}\right)\right)\cdot e^{j\varphi_k} \text{ for non-negative } m\in M_k \text{ and for each k.}$$

Herein, $M_k$ denotes the integer interval:

$$M_k = \left[\text{round}\left(\frac{f_k}{f_s}\cdot L\right) - m_{min,k},\ \text{round}\left(\frac{f_k}{f_s}\cdot L\right) + m_{max,k}\right]\Bigg],$$

where $m_{min,k}$ and $m_{max,k}$ fulfill the above explained constraint such that the intervals are not overlapping. A suitable choice for $m_{min,k}$ and $m_{max,k}$ is to set them to a small integer value, e.g. δ=3. If however the DFT indices related to two neighboring sinusoidal frequencies $f_k$ and $f_{k+1}$ are less than 2δ, then δ is set to $$\text{floor}\left(\frac{\text{round}\left(\frac{f_{k+1}}{f_2}\cdot L\right)-\text{round}\left(\frac{f_k}{f_2}\cdot L\right)}{2}\right)$$

such that it is ensured that the intervals are not overlapping. The function floor(·) is the closest integer to the function argument that is smaller or equal to it.

The next step according to embodiments is to apply the sinusoidal model according to the above expression and to evolve its K sinusoids in time. The assumption that the time indices of the erased segment compared to the time indices of the prototype frame differs by $n_{-1}$ samples means that the phases of the sinusoids advance by $$\theta_k = 2\pi\cdot\frac{f_k}{f_s}n_{-1}.$$

Hence, the DFT spectrum of the evolved sinusoidal model is given by:

$$Y_0(m) = \frac{1}{2}\sum_{k=1}^{K}a_k\cdot\left(\left(W\left(2\pi\left(\frac{m}{L}+\frac{f_k}{f_s}\right)\right)\cdot e^{-j(\varphi_k+\theta_k)}+W\left(2\pi\left(\frac{m}{L}-\frac{f_k}{f_s}\right)\right)\cdot e^{j(\varphi_k+\theta_k)}\right)\right).$$

Applying again the approximation according to which the shifted window function spectra do no overlap gives:

$$\hat{Y}_0(m) = \frac{a_k}{2}\cdot W\left(2\pi\left(\frac{m}{L}-\frac{f_k}{f_s}\right)\right)\cdot e^{j(\varphi_k+\theta_k)}$$

for non-negative $m\in M_k$ and for each k.

Comparing the DFT of the prototype frame $Y_{-1}(m)$ with the DFT of evolved sinusoidal model $Y_0(m)$ by using the approximation, it is found that the magnitude spectrum remains unchanged while the phase is shifted by $$\theta_k = 2\pi\cdot\frac{f_k}{f_s}n_{-1},$$

for each $m\in M_k$.

Hence, the substitution frame can be calculated by the following expression: z(n)=IDFT{Z(m)} with $Z(m)=Y(m)\cdot e^{j\theta_K}$ for non-negative $m\in M_k$ and for each k.

A specific embodiment addresses phase randomization for DFT indices not belonging to any interval $M_k$. As described above, the intervals $M_k$, k=1 . . . K have to be set such that they are strictly non-overlapping which is done using some parameter δ which controls the size of the intervals. It may happen that δ is small in relation to the frequency distance of two neighboring sinusoids. Hence, in that case it happens that there is a gap between two intervals. Consequently, for the corresponding DFT indices m no phase shift according to the above expression $Z(m)=Y(m)\cdot e^{j\theta_k}$ is defined. A suitable choice according to this embodiment is to randomize the phase for these indices, yielding $Z(m)=Y(m)\cdot e^{j2\pi rand(\cdot)}$, where the function rand(·) returns some random number.

In one step, a sinusoidal analysis of a part of a previously received or reconstructed audio signal is performed, wherein the sinusoidal analysis involves identifying frequencies of sinusoidal components, i.e. sinusoids, of the audio signal. Next, in one step, a sinusoidal model is applied on a segment of the previously received or reconstructed audio signal, wherein said segment is used as a prototype frame in order to create a substitution frame for a lost audio frame, and in one step the substitution frame for the lost audio frame is created, involving time-evolution of sinusoidal components, i.e. sinusoids, of the prototype frame, up to the time instance of the lost audio frame, in response to the corresponding identified frequencies.

According to a further embodiment, it is assumed that the audio signal is composed of a limited number of individual sinusoidal components, and that the sinusoidal analysis is performed in the frequency domain. Further, the identifying of frequencies of sinusoidal components may involve identifying frequencies in the vicinity of the peaks of a spectrum related to the used frequency domain transform.

According to an exemplary embodiment, the identifying of frequencies of sinusoidal components is performed with higher resolution than the resolution of the used frequency domain transform, and the identifying may further involve interpolation, e.g. of parabolic type.

According to an exemplary embodiment, the method comprises extracting a prototype frame from an available previously received or reconstructed signal using a window function, and wherein the extracted prototype frame may be transformed into a frequency domain.

A further embodiment involves an approximation of a spectrum of the window function, such that the spectrum of the substitution frame is composed of strictly non-overlapping portions of the approximated window function spectrum.

According to a further exemplary embodiment, the method comprises time-evolving sinusoidal components of a frequency spectrum of a prototype frame by advancing the phase of the sinusoidal components, in response to the frequency of each sinusoidal component and in response to the time difference between the lost audio frame and the prototype frame, and changing a spectral coefficient of the prototype frame included in an interval $M_k$ in the vicinity of a sinusoid k by a phase shift proportional to the sinusoidal frequency $f_k$ and to the time difference between the lost audio frame and the prototype frame.

A further embodiment comprises changing the phase of a spectral coefficient of the prototype frame not belonging to an identified sinusoid by a random phase, or changing the phase of a spectral coefficient of the prototype frame not included in any of the intervals related to the vicinity of the identified sinusoid by a random value.

An embodiment further involves an inverse frequency domain transform of the frequency spectrum of the prototype frame.

More specifically, the audio frame loss concealment method according to a further embodiment may involve the following steps:

1) Analyzing a segment of the available, previously synthesized signal to obtain the constituent sinusoidal frequencies $f_k$ of a sinusoidal model.

2) Extracting a prototype frame $y_{-1}$ from the available previously synthesized signal and calculate the DFT of that frame.

3) Calculating the phase shift $\theta_k$ for each sinusoid k in response to the sinusoidal frequency $f_k$ and the time advance $n_{-1}$ between the prototype frame and the substitution frame.

4) For each sinusoid k advancing the phase of the prototype frame DFT with $\theta_k$ selectively for the DFT indices related to a vicinity around the sinusoid frequency $f_k$.

Calculating the inverse DFT of the spectrum obtained in 4).

The embodiments describe above may be further explained by the following assumptions:

a) The assumption that the signal can be represented by a limited number of sinusoids.

b) The assumption that the substitution frame is sufficiently well represented by these sinusoids evolved in time, in comparison to some earlier time instant.

c) The assumption of an approximation of the spectrum of a window function such that the spectrum of the substitution frame can be built up by non-overlapping portions of frequency shifted window function spectra, the shift frequencies being the sinusoid frequencies.

Information on a further elaboration of the Phase ECU will be presented below:

A concept of the embodiments described hereinafter comprises concealing a lost audio frame by:

performing a sinusoidal analysis of at least part of a previously received or reconstructed audio signal, wherein the sinusoidal analysis involves identifying frequencies of sinusoidal components of the audio signal;

applying a sinusoidal model on a segment of the previously received or reconstructed audio signal, wherein said segment is used as a prototype frame in order to create a substitution frame for a lost frame;

creating the substitution frame for the lost audio frame, involving a time-evolution of sinusoidal components of the prototype frame, up to the time instance of the lost audio frame, based on the corresponding identified frequencies; and performing at least one of an enhanced frequency estimation in the identifying of frequencies, and an adaptation of the creating of the substitution frame in response to the tonality of the audio signal, wherein the enhanced frequency estimation comprises at least one of a main lobe approximation, a harmonic enhancement, and an interframe enhancement.

Embodiments described here comprise enhanced frequency estimation. This may be implemented e.g. by using a main lobe approximation, a harmonic enhancement, or an interframe enhancement, and those three alternative embodiments are described below:

Main Lobe Approximation:

One limitation with the above-described parabolic interpolation arises from that the used parabolas do not approximate the shape of the main lobe of the magnitude spectrum $|W(\Omega)|$ of the window function. As a solution, this embodiment fits a function P(q), which approximates the main lobe of $$\left|W\left(\frac{2\pi}{L}\cdot q\right)\right|,$$

through the grid points of the DFT magnitude spectrum that surround the peaks and calculates the respective frequencies belonging to the function maxima. The function P(q) could be identical to the frequency-shifted magnitude spectrum $$\left|W\left(\frac{2\pi}{L}\cdot(q-\hat{q})\right)\right|$$

of the window function. For numerical simplicity it should however rather for instance be a polynomial which allows for straightforward calculation of the function maximum. The following detailed procedure is applied:

1. Identify the peaks of the DFT of the windowed analysis frame. The peak search will deliver the number of peaks K and the corresponding DFT indexes of the peaks. The peak search can typically be made on the DFT magnitude spectrum or the logarithmic DFT magnitude spectrum.
2. Derive the function P(q) that approximates the magnitude spectrum $$\left|W\left(\frac{2\pi}{L}\cdot q\right)\right|$$

of the window function or of the logarithmic magnitude spectrum $$\log\left|W\left(\frac{2\pi}{L}\cdot q\right)\right|$$

for a given interval $(q_1, q_2)$.

3. For each peak k (with k=1 . . . K) with corresponding DFT index $m_k$ fit the frequency-shifted function $P(q-\hat{q}_k)$ through the two DFT grid points that surround the expected true peak of the continuous spectrum of the windowed sinusoidal signal. Hence, for the case of operating with the logarithmic magnitude spectrum, if $|X(m_k-1)|$ is larger than $|X(m_k+1)|$ fit $P(q-\hat{q}_k)$ through the points $\{P_1; P_2\}=\{(m_k-1, \log(|X(m_k-1)|); (m_k, \log(|X(m_k)|)\}$ and otherwise through the points $\{P_1; P_2\}=\{(m_k, \log(|X(m_k)|); (m_k+1, \log(|X(m_k+1)|)\}$. For the alternative example of operating with a linear rather than a logarithmic magnitude spectrum, if $|X(m_k-1)|$ is larger than $|X(m_k+1)|$ fit $P(q-\hat{q}_k)$ through the points $\{P_1; P_2\}=\{(m_k-1, |X(m_k-1)|; (m_k, |X(m_k)|\}$ and otherwise through the points $\{P_1; P_2\}=\{(m_k, |X(m_k)|; (m_k+1, |X(m_k+1)|\}$.

P(q) can for simplicity be chosen to be a polynomial either of order 2 or 4. This renders the approximation in step 2 a simple linear regression calculation and the calculation of $\hat{q}_k$ straightforward. The interval $(q_1, q_2)$ can be chosen to be fixed and identical for all peaks, e.g. $(q_1, q_2)=(-1,1)$, or adaptive.

In the adaptive approach the interval can be chosen such that the function $P(q-\hat{q}_k)$ fits the main lobe of the window function spectrum in the range of the relevant DFT grid points $\{P_1; P_2\}$.

4. For each of the K frequency shift parameters $\hat{q}_k$ for which the continuous spectrum of the windowed sinusoidal signal is expected to have its peak calculate $\hat{f}_k=\hat{q}_k\cdot f_s/L$ as approximation for the sinusoid frequency $f_k$.

Harmonic Enhancement of the Frequency Estimation

The transmitted signal may be harmonic, which means that the signal consists of sine waves which frequencies are integer multiples of some fundamental frequency $f_0$. This is the case when the signal is very periodic like for instance for voiced speech or the sustained tones of some musical instrument. This means that the frequencies of the sinusoidal model of the embodiments are not independent but rather have a harmonic relationship and stem from the same fundamental frequency. Taking this harmonic property into account can consequently improve the analysis of the sinusoidal component frequencies substantially, and this embodiment involves the following procedure:

1. Check whether the signal is harmonic. This can for instance be done by evaluating the periodicity of signal prior to the frame loss. One straightforward method is to perform an autocorrelation analysis of the signal. The maximum of such autocorrelation function for some time lag $\tau>0$ can be used as an indicator. If the value of this maximum exceeds a given threshold, the signal can be regarded harmonic. The corresponding time lag $\tau$ then corresponds to the period of the signal which is related to the fundamental frequency through $$f_0 = \frac{f_s}{\tau}.$$

Many linear predictive speech coding methods apply so-called open or closed-loop pitch prediction or CELP (code-excited linear prediction) coding using adaptive codebooks. The pitch gain and the associated pitch lag parameters derived by such coding methods are also useful indicators if the signal is harmonic and, respectively, for the time lag.

A further method is described below:

2. For each harmonic index j within the integer range $1 \ldots J_{max}$ check whether there is a peak in the (logarithmic) DFT magnitude spectrum of the analysis frame within the vicinity of the harmonic frequency $f_j = j \cdot f_0$. The vicinity of $f_j$ may be defined as the delta range around $f_j$ where delta corresponds to the frequency resolution of the DFT $$\frac{f_s}{L},$$

i.e. the interval $$\left[j \cdot f_0 - \frac{f_s}{2 \cdot L}, j \cdot f_0 + \frac{f_s}{2 \cdot L}\right].$$

In case such a peak with corresponding estimated sinusoidal frequency $\hat{f}_k$ is present, supersede $\hat{f}_k$ by $\hat{\hat{f}}_k = j \cdot f_0$.

For the procedure given above there is also the possibility to make the check whether the signal is harmonic and the derivation of the fundamental frequency implicitly and possibly in an iterative fashion without necessarily using indicators from some separate method. An example for such a technique is given as follows:

For each $f_{0,p}$ out of a set of candidate values $\{f_{0,1} \ldots f_{0,P}\}$ apply the procedure 2 described above, though without superseding $\hat{f}_k$ but with counting how many DFT peaks are present within the vicinity around the harmonic frequencies, i.e. the integer multiples of $f_{0,p}$. Identify the fundamental frequency $f_{0,p_{max}}$ for which the largest number of peaks at or around the harmonic frequencies is obtained. If this largest number of peaks exceeds a given threshold, then the signal is assumed to be harmonic. In that case $f_{0,p_{max}}$ can be assumed to be the fundamental frequency with which procedure 2 is then executed leading to enhanced sinusoidal frequencies $\hat{\hat{f}}_k$. A more preferable alternative is however first to optimize the fundamental frequency estimate $f_0$ based on the peak frequencies $\hat{f}_k$ that have been found to coincide with harmonic frequencies. Assume a set of M harmonics, i.e. integer multiples $\{n_1 \ldots n_M\}$ of some fundamental frequency that have been found to coincide with some set of M spectral peaks at frequencies $\hat{f}_{k(m)}$, m=1 . . . M, then the underlying (optimized) fundamental frequency estimate $f_{0,opt}$ opt can be calculated to minimize the error between the harmonic frequencies and the spectral peak frequencies. If the error to be minimized is the mean square error $$E_2 = \sum_{m=1}^{M} \left(n_m \cdot f_0 - \hat{f}_{k(m)}\right)^2,$$

then the optimal fundamental frequency estimate is calculated as $$f_{0,opt} = \frac{\sum_{m=1}^{M} n_m \cdot \hat{f}_{k(m)}}{\sum_{m=1}^{M} n_m^2}.$$

The initial set of candidate values $\{f_{0,1} \ldots f_{0,P}\}$ can be obtained from the frequencies of the DFT peaks or the estimated sinusoidal frequencies $\hat{f}_k$.

Interframe Enhancement of Frequency Estimation

According to this embodiment, the accuracy of the estimated sinusoidal frequencies $\hat{f}_k$ is enhanced by considering their temporal evolution. Thus, the estimates of the sinusoidal frequencies from a multiple of analysis frames is combined for instance by means of averaging or prediction. Prior to averaging or prediction a peak tracking is applied that connects the estimated spectral peaks to the respective same underlying sinusoids.

Applying a Sinusoidal Model

The application of a sinusoidal model in order to perform a frame loss concealment operation according to embodiments may be described as follows:

In case a given segment of the coded signal cannot be reconstructed by the decoder since the corresponding encoded information is not available, i.e.

since a frame has been lost, an available part of the signal prior to this segment may be used as prototype frame. If y(n) with n=0 . . . N−1 is the unavailable segment for which a substitution frame z(n) has to be generated, and y(n) with n<0 is the available previously decoded signal, a prototype frame of the available signal of length L and start index $n_{-1}$ is extracted with a window function w(n) and transformed into frequency domain, e.g. by means of DFT:

$$Y_{-1}(m) = \sum_{n=0}^{L-1} y(n - n_{-1}) \cdot w(n) \cdot e^{-j\frac{2\pi}{L}nm}$$

The window function can be one of the window functions described above in the sinusoidal analysis. Preferably, in order to save numerical complexity, the frequency domain transformed frame should be identical with the one used during sinusoidal analysis, which means that the analysis frame and the prototype frame will be identical, and likewise their respective frequency domain transforms.

In a next step the sinusoidal model assumption is applied. According to the sinusoidal model assumption, the DFT of the prototype frame can be written as follows:

$$Y_{-1}(m) = \frac{1}{2}\sum_{k=1}^{K} a_k \cdot \left(\left(W\left(2\pi\left(\frac{m}{L} + \frac{f_k}{f_s}\right)\right) \cdot e^{j\varphi_k} + W\left(2\pi\left(\frac{m}{L} - \frac{f_k}{f_s}\right)\right) \cdot e^{j\varphi_k}\right)\right).$$

This expression was also used in the analysis part and is described in detail above.

Next, it is realized that the spectrum of the used window function has only a significant contribution in a frequency range close to zero. As noted above, the magnitude spectrum of the window function is large for frequencies close to zero and small otherwise (within the normalized frequency range from $-\pi$ to $\pi$, corresponding to half the sampling frequency). Hence, as an approximation it is assumed that the window spectrum W(m) is non-zero only for an interval $M=[-m_{min}, m_{max}]$, with $m_{min}$ and $m_{max}$ being small positive numbers. In particular, an approximation of the window function spectrum is used such that for each k the contributions of the shifted window spectra in the above expression are strictly non-overlapping. Hence in the above equation for each frequency index there is always only at maximum the contribution from one summand, i.e. from one shifted window spectrum. This means that the expression above reduces to the following approximate expression:

$$\hat{Y}_{-1}(m) = \frac{a_k}{2} \cdot W\left(2\pi\left(\frac{m}{L} - \frac{f_k}{f_s}\right)\right) \cdot e^{j\varphi_k} \text{ for non-negative } m \in M_k \text{ and for each } k.$$

Herein, $M_k$ denotes the integer interval $$M_k = \left[\text{round}\left(\frac{f_k}{f_s} \cdot L\right) - m_{min,k}, \text{round}\left(\frac{f_k}{f_s} \cdot L\right) + m_{max,k}\right],$$

where $m_{min,k}$ and $m_{max,k}$ fulfill the above explained constraint such that the intervals are not overlapping. A suitable choice for $m_{min,k}$ and $m_{max,k}$ is to set them to a small integer value $\delta$, e.g. $\delta=3$. If however the DFT indices related to two neighboring sinusoidal frequencies $f_k$ and $f_{k+1}$ are less than $2\delta$, then $\delta$ is set to $$\text{floor}\left(\frac{\text{round}\left(\frac{f_{k+1}}{f_s} \cdot L\right) - \text{round}\left(\frac{f_k}{f_s} \cdot L\right)}{2}\right)$$

such that it is ensured that the intervals are not overlapping. The function floor(·) is the closest integer to the function argument that is smaller or equal to it.

The next step according to embodiments is to apply the sinusoidal model according to the above expression and to evolve its K sinusoids in time. The assumption that the time indices of the erased segment compared to the time indices of the prototype frame differs by n_1 samples means that the phases of the sinusoids advance by $$\theta_k = 2\pi \cdot \frac{f_k}{f_s} n_{-1}.$$

Hence, the DFT spectrum of the evolved sinusoidal model is given by:

$$Y_0(m) = \frac{1}{2}\sum_{k=1}^{K} a_k \cdot \left(\left(W\left(2\pi\left(\frac{m}{L} + \frac{f_k}{f_s}\right)\right) \cdot e^{-j(\varphi_k+\theta_k)} + W\left(2\pi\left(\frac{m}{L} - \frac{f_k}{f_s}\right)\right) \cdot e^{j(\varphi_k+\theta_k)}\right)\right).$$

Applying again the approximation according to which the shifted window function spectra do no overlap gives:

$$\hat{Y}_0(m) = \frac{a_k}{2} \cdot W\left(2\pi\left(\frac{m}{L} - \frac{f_k}{f_s}\right)\right) \cdot e^{j(\varphi_k+\theta_k)} \text{ for non-negative } m \in M_k \text{ and for each } k.$$

Comparing the DFT of the prototype frame Y_1(m) with the DFT of evolved sinusoidal model $Y_0(m)$ by using the approximation, it is found that the magnitude spectrum remains unchanged while the phase is shifted by $$\theta_k = 2\pi \cdot \frac{f_k}{f_s} n_{-1},$$

for each $m \in M_k$. Hence, the substitution frame can be calculated by the following expression:

$z(n)=\text{IDFT}\{Z(m)\}$ with $Z(m)=Y(m)\cdot e^{j\theta_k}$ for non-negative $m \in M_k$ and for each k, where IDFT denotes the inverse DFT.

A specific embodiment addresses phase randomization for DFT indices not belonging to any interval $M_k$. As described above, the intervals $M_k$, k=1 . . . K, have to be set such that they are strictly non-overlapping which is done using some parameter $\delta$ which controls the size of the intervals. It may happen that $\delta$ is small in relation to the frequency distance of two neighboring sinusoids. Hence, in that case it happens that there is a gap between two intervals. Consequently, for the corresponding DFT indices m no phase shift according to the above expression $Z(m)=Y(m)\cdot e^{j\theta_k}$ is defined. A suitable choice according to this embodiment is to randomize the phase for these indices, yielding $Z(m)=Y(m)\cdot e^{j2\pi rand(\cdot)}$, where the function rand(·) returns some random number.

Embodiments adapting the size of the intervals $M_k$ in response to the tonality of the signal are described in the following.

One embodiment of this invention comprises adapting the size of the intervals $M_k$ in response to the tonality the signal. This adapting may be combined with the enhanced frequency estimation described above, which uses e.g. a main lobe approximation, a harmonic enhancement, or an interframe enhancement. However, an adapting of the size of the intervals $M_k$ in response to the tonality the signal may alternatively be performed without any preceding enhanced frequency estimation.

It has been found beneficial for the quality of the reconstructed signals to optimize the size of the intervals $M_k$. In particular, the intervals should be larger if the signal is very tonal, i.e. when it has clear and distinct spectral peaks. This is the case for instance when the signal is harmonic with a clear periodicity. In other cases where the signal has less pronounced spectral structure with broader spectral maxima, it has been found that using small intervals leads to better quality. This finding leads to a further improvement according to which the interval size is adapted according to the properties of the signal. One realization is to use a tonality or a periodicity detector. If this detector identifies the signal as tonal, the δ-parameter controlling the interval size is set to a relatively large value. Otherwise, the δ-parameter is set to relatively smaller values.

A sinusoidal analysis of a part of a previously received or reconstructed audio signal is performed, wherein the sinusoidal analysis involves, in one step, identifying frequencies of sinusoidal components, i.e. sinusoids, of the audio signal. In one step, a sinusoidal model is applied on a segment of the previously received or reconstructed audio signal, wherein said segment is used as a prototype frame in order to create a substitution frame for a lost audio frame, and in one step the substitution frame for the lost audio frame is created, involving time-evolution of sinusoidal components, i.e. sinusoids, of the prototype frame, up to the time instance of the lost audio frame, in response to the corresponding identified frequencies. However, the step of identifying frequencies of sinusoidal components and/or the step of creating the substitution frame may further comprise performing at least one of an enhanced frequency estimation in the identifying of frequencies, and an adaptation of the creating of the substitution frame in response to the tonality of the audio signal. The enhanced frequency estimation comprises at least one of a main lobe approximation a harmonic enhancement, and an interframe enhancement.

According to a further embodiment, it is assumed that the audio signal is composed of a limited number of individual sinusoidal components.

According to an exemplary embodiment, the method comprises extracting a prototype frame from an available previously received or reconstructed signal using a window function, and wherein the extracted prototype frame may be transformed into a frequency domain representation.

According to a first alternative embodiment, the enhanced frequency estimation comprises approximating the shape of a main lobe of a magnitude spectrum related to a window function, and it may further comprise identifying one or more spectral peaks, k, and the corresponding discrete frequency domain transform indexes $m_k$ associated with an analysis frame; deriving a function P(q) that approximates the magnitude spectrum related to the window function, and for each peak, k, with a corresponding discrete frequency domain transform index $m_k$, fitting a frequency-shifted function $P(q-q_k)$ through two grid points of the discrete frequency domain transform surrounding an expected true peak of a continuous spectrum of an assumed sinusoidal model signal associated with the analysis frame.

According to a second alternative embodiment, the enhanced frequency estimation is a harmonic enhancement, comprising determining whether the audio signal is harmonic, and deriving a fundamental frequency, if the signal is harmonic. The determining may comprise at least one of performing an autocorrelation analysis of the audio signal and using a result of a closed-loop pitch prediction, e.g. the pitch gain. The step of deriving may comprise using a further result of a closed-loop pitch prediction, e. g. the pitch lag. Further according to this second alternative embodiment, the step of deriving may comprise checking, for a harmonic index j, whether there is a peak in a magnitude spectrum within the vicinity of a harmonic frequency associated with said harmonic index and a fundamental frequency, the magnitude spectrum being associated with the step of identifying.

According to a third alternative embodiment, the enhanced frequency estimation is an interframe enhancement, comprising combining identified frequencies from two or more audio signal frames. The combining may comprise an averaging and/or a prediction, and a peak tracking may be applied prior to the averaging and/or prediction.

According to an embodiment, the adaptation in response to the tonality of the audio signal involves adapting a size of an interval $M_k$ located in the vicinity of a sinusoidal component k, depending on the tonality of the audio signal.

Further, the adapting of the size of an interval may comprise increasing the size of the interval for an audio signal having comparatively more distinct spectral peaks, and reducing the size of the interval for an audio signal having comparatively broader spectral peaks.

The method according to embodiments may comprise time-evolving sinusoidal components of a frequency spectrum of a prototype frame by advancing the phase of a sinusoidal component, in response to the frequency of this sinusoidal component and in response to the time difference between the lost audio frame and the prototype frame. It may further comprise changing a spectral coefficient of the prototype frame included in the interval $M_k$ located in the vicinity of a sinusoid k by a phase shift proportional to the sinusoidal frequency $f_k$ and the time difference between the lost audio frame and the prototype frame.

Embodiments may also comprise an inverse frequency domain transform of the frequency spectrum of the prototype frame, after the above-described changes of the spectral coefficients.

More specifically, the audio frame loss concealment method according to a further embodiment may involve the following steps:

1) Analyzing a segment of the available, previously synthesized signal to obtain the constituent sinusoidal frequencies $f_k$ of a sinusoidal model.
2) Extracting a prototype frame $y_{-1}$ from the available previously synthesized signal and calculate the DFT of that frame.
3) Calculating the phase shift $\theta_k$ for each sinusoid k in response to the sinusoidal frequency $f_k$ and the time advance n_1 between the prototype frame and the substitution frame, wherein the size of the interval $M_k$ may have been adapted in response to the tonality of the audio signal.
4) For each sinusoid k advancing the phase of the prototype frame DFT with $\theta_k$ selectively for the DFT indices related to a vicinity around the sinusoid frequency $f_k$.
5) Calculating the inverse DFT of the spectrum obtained in step 4).

The embodiments describe above may be further explained by the following assumptions:

d) The assumption that the signal can be represented by a limited number of sinusoids.
e) The assumption that the substitution frame is sufficiently well represented by these sinusoids evolved in time, in comparison to some earlier time instant.
f) The assumption of an approximation of the spectrum of a window function such that the spectrum of the substitution frame can be built up by non-overlapping portions of frequency shifted window function spectra, the shift frequencies being the sinusoid frequencies.

The below below is related to a control method for Phase ECU, which was previously mentioned.

Adaptation of the Frame Loss Concealment Method

In case the steps carried out above indicate a condition suggesting an adaptation of the frame loss concealment operation the calculation of the spectrum of the substitution frame is modified.

While the original calculation of the substitution frame spectrum is done according to the expression $Z(m)=Y(m)\cdot e^{j\theta_k}$, now an adaptation is introduced modifying both magnitude and phase. The magnitude is modified by means of scaling with two factors α(m) and β(m) and the phase is modified with an additive phase component ϑ(m). This leads to the following modified calculation of the substitution frame:

$$Z(m)=\alpha(m)\cdot\beta(m)\cdot Y(m)\cdot e^{j(\theta_k+\vartheta(m))}.$$

It is to be noted that the original (non-adapted) frame-loss concealment methods is used if α(m)=1, β(m)=1, and ϑ(m)=0. These respective values are hence the default.

The general objective with introducing magnitude adaptations is to avoid audible artifacts of the frame loss concealment method. Such artifacts may be musical or tonal sounds or strange sounds arising from repetitions of transient sounds. Such artifacts would in turn lead to quality degradations, which avoidance is the objective of the described adaptations. A suitable way to such adaptations is to modify the magnitude spectrum of the substitution frame to a suitable degree.

An embodiment of concealment method modification will now be disclosed. Magnitude adaptation is preferably done if the burst loss counter $n_{burst}$ exceeds some threshold $thr_{burst}$, e.g. $thr_{burst}=3$. In that case a value smaller than 1 is used for the attenuation factor, e.g. α(m)=0.1.

It has however been found that it is beneficial to perform the attenuation with gradually increasing degree. One preferred embodiment which accomplishes this is to define a logarithmic parameter specifying a logarithmic increase in attenuation per frame, att_per_frame. Then, in case the burst counter exceeds the threshold the gradually increasing attenuation factor is calculated by $$\alpha(m)=10^{c\cdot att\_per\_frame\cdot(n_{burst}-thr_{burst})}.$$

Here the constant c is mere a scaling constant allowing to specify the parameter att_per_frame for instance in decibels (dB).

An additional preferred adaptation is done in response to the indicator whether the signal is estimated to be music or speech. For music content in comparison with speech content it is preferable to increase the threshold $thr_{burst}$ and to decrease the attenuation per frame. This is equivalent with performing the adaptation of the frame loss concealment method with a lower degree. The background of this kind of adaptation is that music is generally less sensitive to longer loss bursts than speech. Hence, the original, i.e. the unmodified frame loss concealment method is still preferable for this case, at least for a larger number of frame losses in a row.

A further adaptation of the concealment method with regards to the magnitude attenuation factor is preferably done in case a transient has been detected based on that the indicator $R_{l/r,\ band}(k)$ or alternatively $R_{l/r}$ (m) or $R_{l/r}$ have passed a threshold. In that case a suitable adaptation action is to modify the second magnitude attenuation factor β(m) such that the total attenuation is controlled by the product of the two factors α(m)·β(m).

β(m) is set in response to an indicated transient. In case an offset is detected the factor β(m) is preferably be chosen to reflect the energy decrease of the offset. A suitable choice is to set β(m) to the detected gain change:

$$\beta(m)=\sqrt{R_{l/r,band}(k)},\text{for } m\in I_k, k=1\ \ldots\ K.$$

In case an onset is detected it is rather found advantageous to limit the energy increase in the substitution frame. In that case the factor can be set to some fixed value of e.g. 1, meaning that there is no attenuation but not any amplification either.

In the above it is to be noted that the magnitude attenuation factor is preferably applied frequency selectively, i.e. with individually calculated factors for each frequency band. In case the band approach is not used, the corresponding magnitude attenuation factors can still be obtained in an analogue way. β(m) can then be set individually for each DFT bin in case frequency selective transient detection is used on DFT bin level. Or, in case no frequency selective transient indication is used at all β(m) can be globally identical for all m.

A further preferred adaptation of the magnitude attenuation factor is done in conjunction with a modification of the phase by means of the additional phase component ϑ(m). In case for a given m such a phase modification is used, the attenuation factor β(m) is reduced even further. Preferably, even the degree of phase modification is taken into account. If the phase modification is only moderate, β(m) is only scaled down slightly, while if the phase modification is strong, β(m) is scaled down to a larger degree.

The general objective with introducing phase adaptations is to avoid too strong tonality or signal periodicity in the generated substitution frames, which in turn would lead to quality degradations. A suitable way to such adaptations is to randomize or dither the phase to a suitable degree.

Such phase dithering is accomplished if the additional phase component ϑ(m) is set to a random value scaled with some control factor: ϑ(m)=α(m)·rand(·).

The random value obtained by the function rand(·) is for instance generated by some pseudo-random number generator. It is here assumed that it provides a random number within the interval [0, 2π].

The scaling factor α(m) in the above equation control the degree by which the original phase $\theta_k$ is dithered. The following embodiments address the phase adaptation by means of controlling this scaling factor. The control of the scaling factor is done in an analogue way as the control of the magnitude modification factors described above.

According to a first embodiment scaling factor α(m) is adapted in response to the burst loss counter. If the burst loss counter $n_{burst}$ exceeds some threshold $thr_{burst}$, e.g. $thr_{burst}=3$, a value larger than 0 is used, e.g. α(m)=0.2.

It has however been found that it is beneficial to perform the dithering with gradually increasing degree. One preferred embodiment which accomplishes this is to define a parameter specifying an increase in dithering per frame, dith_increase_per_frame. Then in case the burst counter exceeds the threshold the gradually increasing dithering control factor is calculated by $$\alpha(m)=\text{dith\_increase\_per\_frame}\cdot(n_{burst}-\text{thr}_{burst}).$$

It is to be noted in the above formula that α(m) has to be limited to a maximum value of 1 for which full phase dithering is achieved.

It is to be noted that the burst loss threshold value $\text{thr}_{burst}$ used for initiating phase dithering may be the same threshold as the one used for magnitude attenuation. However, better quality can be obtained by setting these thresholds to individually optimal values, which generally means that these thresholds may be different.

An additional preferred adaptation is done in response to the indicator whether the signal is estimated to be music or speech. For music content in comparison with speech content it is preferable to increase the threshold $\text{thr}_{burst}$ meaning that phase dithering for music as compared to speech is done only in case of more lost frames in a row. This is equivalent with performing the adaptation of the frame loss concealment method for music with a lower degree. The background of this kind of adaptation is that music is generally less sensitive to longer loss bursts than speech. Hence, the original, i.e. unmodified frame loss concealment method is still preferable for this case, at least for a larger number of frame losses in a row.

A further preferred embodiment is to adapt the phase dithering in response to a detected transient. In that case a stronger degree of phase dithering can be used for the DFT bins m for which a transient is indicated either for that bin, the DFT bins of the corresponding frequency band or of the whole frame.

Part of the schemes described address optimization of the frame loss concealment method for harmonic signals and particularly for voiced speech.

In case the methods using an enhanced frequency estimation as described above are not realized another adaptation possibility for the frame loss concealment method optimizing the quality for voiced speech signals is to switch to some other frame loss concealment method that specifically is designed and optimized for speech rather than for general audio signals containing music and speech. In that case, the indicator that the signal comprises a voiced speech signal is used to select another speech-optimized frame loss concealment scheme rather than the schemes described above.

In summary, it is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A packet loss concealment method for burst error handling, the method being performed by a receiving entity, the method comprising:

generating a substitution frame spectrum by use of a primary frame loss concealment method, wherein the substitution frame spectrum is based on a spectrum of a frame of a previously received audio signal;

determining a noise component, wherein a frequency characteristic of the noise component is a low-resolution spectral representation of the frame of the previously received audio signal;

determining whether a number n of lost or erroneous frames exceeds a threshold;

if the number n of lost or erroneous frames does not exceed the threshold, adding the noise component to the substitution frame spectrum;

if the number n of lost or erroneous frames exceeds the threshold, applying attenuation to the noise component before adding the noise component to the substitution frame spectrum.

2. The method according to claim 1, wherein the threshold is greater than or equal to 10.

3. The method according to claim 1, wherein a substitution frame spectrum generated by the primary frame loss concealment method is expressed as $Z(m)=\alpha(m)\cdot Y(m)\cdot e^{j(\theta_k+\vartheta(m))}$, wherein Y(m) is a frequency domain representation of the frame of the previously received audio signal, $\alpha(m)$ is a scaling factor and $\vartheta(m)$ is a phase randomization term.

4. The method according to claim 3, wherein the noise component is denoted as $B(m)\cdot\bar{Y}(m)\cdot e^{j(n(m))}$, wherein $\beta(m)$ is a magnitude scaling factor, $\eta(m)$ is a random phase and $\bar{Y}(m)$ is a low-resolution magnitude spectrum representation of the frame of the previously received audio signal.

5. The method according to claim 4, further comprising determining the magnitude scaling factor $\beta(m)$ for the noise component such that $\beta(m)$ compensates for energy loss resulting from applying the scaling factor $\alpha(m)$ to the substitution frame.

6. The method according to claim 5, wherein the scaling factors $\alpha(m)$ and $\beta(m)$ are frequency-group-wise constant.

7. The method according to claim 1, further comprising obtaining said low-resolution representation of said magnitude spectrum by frequency-group-wise averaging a multitude of low-resolution frequency domain transforms of said signal in said previously received frame.

8. A decoder for packet loss concealment, the receiving entity comprising a processing circuitry, the processing circuitry being configured to cause the receiving entity to:

generate a substitution frame spectrum by use of a primary frame loss concealment method, wherein the substitution frame spectrum is based on a spectrum of a frame of a previously received audio signal;

determine a noise component, wherein a frequency characteristic of the noise component is a low-resolution spectral representation of the frame of the previously received audio signal;

determine whether a number n of lost or erroneous frames exceeds a threshold;

add the noise component to the substitution frame spectrum, if the number n of lost or erroneous frames does not exceed the threshold;

apply attenuation to the noise component if the number n of lost or erroneous frames exceeds the threshold and after applying the attenuation factor, add the noise component to the substitution frame spectrum.

9. The decoder according to claim 8, wherein the threshold is greater than or equal to 10.

10. The decoder according to claim 8, wherein a substitution frame spectrum of the primary frame loss concealment method is expressed as $Z(m)=\alpha(m)\cdot Y(m)\cdot e^{j(\theta_k+\vartheta(m))}$, wherein Y(m) is a frequency domain representation of the frame of the previously received audio signal, $\alpha(m)$ is a scaling factor and $\vartheta(m)$ is a phase randomization term.

11. The decoder according to claim 10, wherein the noise component is denoted as $\beta(m)\cdot\bar{Y}(m)\cdot e^{j(\eta(m))}$, wherein $\beta(m)$ is a magnitude scaling factor, $\eta(m)$ is a random phase and $\bar{Y}(m)$ is a low-resolution magnitude spectrum representation of the frame of the previously received audio signal.

12. The decoder according to claim 11, the processing circuitry being further configured to cause the receiving entity to: determine the magnitude scaling factor $\beta(m)$ for the noise component such that $\beta(m)$ compensates for energy loss resulting from applying the scaling factor $\alpha(m)$ to the substitution frame.

13. The decoder according to claim 12, wherein the scaling factors $\alpha(m)$ and $\beta(m)$ are frequency-group-wise constant.

14. The decoder according to claim 8, the processing circuitry being further configured to cause the receiving entity to: obtain said low-resolution representation of said magnitude spectrum by frequency-group-wise averaging a multitude of low-resolution frequency domain transforms of said signal in said previously received frame.

* * * * *